(12) United States Patent
Mukai et al.

(10) Patent No.: US 6,215,961 B1
(45) Date of Patent: *Apr. 10, 2001

(54) CAMERA

(75) Inventors: Hiromu Mukai, Kawachinagano; Kazumi Kageyama; Akira Shiraishi, both of Sakai; Kyoichi Miyazaki, Izumiotsu; Yoshinori Sugiyama, Izuma; Ichiro Tsujimura, Higashiosaka, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,805

(22) Filed: Jan. 28, 1997

(30) Foreign Application Priority Data

Jan. 29, 1996 (JP) .................................................. 8-013369
Jan. 29, 1996 (JP) .................................................. 8-013370
Jan. 29, 1996 (JP) .................................................. 8-013371

(51) Int. Cl.$^7$ .......................... G03B 13/34; G03B 3/10; G03B 7/08
(52) U.S. Cl. ........................ 396/100; 396/121; 396/233
(58) Field of Search ................................. 396/100, 102, 396/121, 233, 234

(56) References Cited

U.S. PATENT DOCUMENTS

| | | | |
|---|---|---|---|
| 4,047,187 | * 9/1977 | Mashimo et al. | 354/23 |
| 4,240,726 | * 12/1980 | Wick | 354/25 |
| 4,791,446 | * 12/1988 | Ishida et al. | 354/408 |
| 4,937,611 | * 6/1990 | Miyazaki | 354/432 |
| 5,023,649 | * 6/1991 | Hayashi et al. | 354/434 |
| 5,115,269 | * 5/1992 | Masanaga et al. | 354/420 |
| 5,128,708 | * 7/1992 | Murayama et al. | 354/430 |
| 5,721,978 | * 2/1998 | Saito | 396/100 |

FOREIGN PATENT DOCUMENTS

| | | |
|---|---|---|
| 55-97723 | * 7/1980 | (JP) . |
| 58-131023 | * 9/1983 | (JP) . |
| 58-131025 | * 9/1983 | (JP) . |
| 60-129732 | * 7/1985 | (JP) . |
| 3-103727 | * 4/1991 | (JP) . |
| 3-35530 | * 4/1991 | (JP) . |
| 3-253829 | * 11/1991 | (JP) . |

OTHER PUBLICATIONS

Shashin Kogyo, "Program AE Having A Capability of Exposure Correction" vol. 47, No. 9, Sep. 1989 (with partial translation).*

Shashin Kogyo, "AE", vol. 49, No. 9, Sep. 1991 (with partial translation).*

Shashin Kogyo, "PENTAX ESPIO 80", vol. 52, No. 10, Oct. 1994 (with partial translation).*

* cited by examiner

Primary Examiner—Christopher E. Mahoney
(74) Attorney, Agent, or Firm—McDermott, Will & Emery

(57) ABSTRACT

A camera including a first and second luminance detector, a distance detector and a calculator. The first luminance detector, having a first spectral sensitivity and receiving light from a larger region of a photographing view, generates a first luminance information. The distance detector, having a second spectral sensitivity and receiving light from a smaller region of the photographing view, generates a distance information concerning a distance to an object. The second luminance detector generates a second luminance information based on the received light of the distance detector. The calculator calculates a control luminance value for exposure control based on the first luminance information and the second luminance information when the first luminance information is above a predetermined threshold value. In addition, the calculator calculates a control luminance value based on the first luminance information when the first luminance information is below the predetermined threshold value.

34 Claims, 19 Drawing Sheets

FIG. 7

| OBJECT DISTANCE (m) | LONG $a \leq D < \infty$ | | | | | | MIDDLE $b \leq D < a$ | | | | | | SHORT $c \leq D < b$ | | | | | |
|---|---|---|---|---|---|---|---|---|---|---|---|---|---|---|---|---|---|---|
| AE AREA | 1 | 2 | 3 | 4 | 5 | 6 | 1 | 2 | 3 | 4 | 5 | 6 | 1 | 2 | 3 | 4 | 5 | 6 |
| AF AREA — ALL LOW | ● | ● | ● | ● | ● | ● | ● | ● | ● | ● | ● | ● | ● | ● | ● | ● | ● | ● |
| 1 | ● | ● | – | – | – | – | ● | ● | ● | – | – | – | ● | ● | ● | ● | ● | ● |
| 2 | – | ● | ● | – | – | – | ● | ● | ● | ● | – | – | ● | ● | ● | ● | ● | ● |
| 3 | – | – | ● | ● | – | – | ● | ● | ● | ● | – | – | ● | ● | ● | ● | ● | ● |
| 4 | – | – | – | ● | ● | – | – | ● | ● | ● | ● | ● | ● | ● | ● | ● | ● | ● |
| 5 | – | – | – | – | ● | ● | – | – | ● | ● | ● | ● | ● | ● | ● | ● | ● | ● |
| 6 | ● | ● | ● | ● | ● | ● | ● | ● | ● | ● | ● | ● | ● | ● | ● | ● | ● | ● |

$D = d1(m)$ $(\beta = \beta1)$ $D = d2(m)$ $(\beta = \beta2)$ $D = d3(m)$ $(\beta = \beta3)$ d3 > d2 > d1

β3 > β2 > β1

CAMERA

BACKGROUND OF THE INVENTION

This invention relates to a camera which uses a distance detecting sensor for automatic focusing (AF) also as a light detecting sensor for automatic exposure (AE) and calculates a spot light detection information in the center of a viewfinder frame using an output of the light detecting sensor.

For example, in the case that a main object image and a background image coexist within a light detection area because a main object is at a long distance from a camera and the size of the main object image located in the center of a viewfinder screen is small, it is desirable to accurately discriminate a brightness balance of the main object and the background and to obtain a light detection information for the main object (in-focus position) with high accuracy in order to set a proper exposure control value for the main object. The same can also be said for cameras provided with a zoom lens because, in such cameras, the size of the main object image within the viewfinder screen varies according to a zoom ratio of the zoom lens regardless of an object distance and, accordingly, a proper exposure control value for the main object largely varies according to an angle of view. Since standard compact cameras of recent years are provided with a zoom lens, it is desirable to obtain a precise light detection information for the main object according to an angle of view with high accuracy.

There is known a camera which uses a distance detecting sensor for AF to perform a spot light detection in the center of a viewfinder screen in order to accurately detect a brightness of a main object image located in the center of the viewfinder screen. For example, Japanese Unexamined Utility Model Publication No. 55-97723 discloses a camera in which a photoreceptor for receiving a light reflected by a sensing surface of a distance detecting sensor is disposed in the vicinity of the distance detecting sensor, and a deviation of an output of the distance detecting sensor from an accurate brightness of an object is corrected by an output of the photoreceptor. Further, Japanese Unexamined Utility Model Publication No. 58-131023 discloses a camera in which, after an analog signal output from a distance detecting sensor is converted into a digital signal, a distance detection information and a light detection information are calculated.

However, in the cameras disclosed in the above publications, since the light detection information is obtained for an entire light detecting area of the distance detecting sensor without dividing it into sub-areas, it is difficult to obtain a highly accurate light detection information for an in-focus position (spot light detection information).

As a method for overcoming the above problem, Japanese Unexamined Utility Model Publication No. 3-35530 discloses a technique of dividing a light detecting area of the light detecting sensor into a plurality of sub-areas and calculating a light detection information for each sub-area. Further, for example, compact cameras adopt a technique of dividing a viewfinder screen into a central portion and a peripheral portion, collectively discriminating pieces of light detection information calculated for the respective sub-areas and determining a light detection information for AE. There is also known a technique of dividing a distance detecting area of a distance detecting sensor into a plurality of sub-areas and calculating a distance detection information for each sub-area.

In the case that the distance detecting sensor is used also as the light detecting sensor, it is preferable to divide the distance detecting area into a plurality of sub-areas and to detect a distance detection data and a light detection data for each sub-area. In such a case, since different calculations are performed to obtain an object brightness and an object distance using pixel data from the distance detecting sensor, it is necessary to effectively use the pixel data in consideration of calculation times, a memory capacity, other factors. More preferably, the distance detection calculation and the light detection calculation may be performed independently. However, such a method necessitates a memory for storing the pixel data for the respective calculations, leading to an increase in memory capacity. Particularly, if a method for dividing an image sensing area of the distance detecting sensor into a plurality of light detecting areas and distance detecting areas and calculating a distance detection information and a light detection information for each distance detecting area and for each light detecting area is adopted to enhance distance and light detecting accuracies, the calculations become more complicated, making it exceedingly difficult to reduce a memory capacity.

There is another problem resulting from the fact that the spectral sensitivity of the distance detecting sensor is generally skewed toward an infrared spectrum. Since the light detection information obtained based on the output of the distance detecting sensor differs from the one obtained based on a usual light detecting sensor whose spectral sensitivity lies in a visible spectrum, the use of the output of the distance detecting sensor directly as a light detection information is problematic in view of light detecting accuracy. Particularly, in the case that a light detecting sensor for obtaining an average light detection information for the entire viewfinder screen is separately provided and a control exposure value is set based on an average light detection data obtained from the output of the average light detecting sensor and the spot light detection data obtained from the output of the distance detecting sensor, a light detection level needs to be adjusted.

There is known a light detecting device which enhances a light detecting accuracy by correcting a light detection information calculated based on an output of a distance detecting sensor. For example, Japanese Unexamined Patent Publication No. 3-1030727 discloses a light detecting device which enhances the accuracy of a light detection information by correcting a light detection information obtained based on an output of a distance detecting sensor by a correction data for an object brightness obtained in the same position as a distance detecting area of the distance detecting sensor. More specifically, a light detecting element for monitoring the object brightness by receiving a light reflected by a sensing surface of a distance detecting sensor is provided in the vicinity of this sensing surface; a distance detection information is calculated using the output of the distance detecting sensor; a spot light detection information is calculated; and the calculated spot light detection information is corrected by the correction data for the object brightness which is calculated from the output of the light detecting element.

However, since the light detecting sensor for monitoring the object brightness is provided in the vicinity of the distance detecting sensor in the light detecting device disclosed in Japanese Unexamined Patent Publication No. 3-1030727, the distance detecting sensor used also for the spot light detection disadvantageously becomes larger. There may be adopted a method for correcting the output of the distance detecting sensor by providing an IR-cut filter directly on the distance detecting sensor. However, the adoption of such a method brings about problems: (1) the distance detecting sensor cannot play its principal role because an incident light is reflected by the IR-cut filter, and (2) an increased number of members lead to an increased production cost. In view of the above, it is preferred that the distance detecting sensor be used also as the light detecting sensor without changing the construction thereof.

Further, in the case that the distance detecting sensor is used also as the light detecting sensor, if a back light discrimination is made based on a brightness difference between the average light detection data and the spot light detection data, the spectral sensitivity of the distance detecting sensor differs from that of the light detecting sensor. If a light source illuminating the object is an artificial light source such as a fluorescent lamp or an incandenscent lamp, the spot light detection data has a reduced reliability. Accordingly, the discrimination result also has a reduced reliability. For example, since light from a fluorescent lamp contains almost no wavelength components longer than 700 nm, the spot light detection data is a value at an underexposure side while the average light detection data is a value at an overexposure side. Further, since light from an incandenscent lamp contains a great number of wavelength components within an infrared spectrum, the spot light detection data is a value at the overexposure side while the average light detection data is a value at the underexposure side. Thus, if the light source is an artificial light source, the brightness difference between the light detection data obtained by the light detecting sensor and the spot light detection data largely varies. It is difficult to make an accurate back light discrimination under an artificial light source and, therefore, the exposure control performed based on such an back light discrimination is highly likely to be proper.

Japanese Unexamined Patent Publication No. 3-253829 discloses a camera capable of discriminating whether or not a scene to be photographed is back lit based on a light detection data from a light detecting device and a spot light detection data from a distance detecting device. Further, Japanese Unexamined Patent Publication No. 60-129732 discloses a camera capable of discriminating whether or not a scene to be photographed is back lit based on a light detection data from a light detecting device and a spot light detection data from a distance detecting device, discriminating whether or not an object distance lies within a flash photographing permitting range based on the light detection data from the distance detecting device, and automatically firing a flash device to perform a daytime synchronized photographing if the scene to be photographed is back lit and the object distance lies within the flash photographing permitting range.

However, the cameras disclosed in the above two publications do not perform an exposure control in view of a variation in reliability of the light detection data depending on the light source in the case that the distance detecting sensor is used also as the light detecting sensor. Accordingly, it is difficult to perform a proper exposure control under an artificial light source.

SUMMARY OF THE INVENTION

It is an object of the present invention to provide a camera which has overcome the problems residing in the prior art.

It is another object of the present invention to provide a camera which can obtain a spot light detection information suitable for a main object based on pixel data from a distance detecting sensor with as small a memory capacity as possible.

It is yet another object of the present invention to provide a camera which can obtain an accurate spot light detection information from the distance detecting sensor by reducing a light detecting error resulting from the spectral sensitivity of the distance detecting sensor and perform a proper exposure control based on this spot light detection information.

According to one aspect of the present invention, a camera comprising: a first luminance detector which has a first spectral sensitivity, and receives light from a larger region of a photographing view, and generates a first luminance information based on the received light; a distance detector which has a second spectral sensitivity, and receives light from a smaller region of the photographing view, and generates a distance information concerning a distance to an object based on the received light; a second luminance detector which generates a second luminance information based on the received light of the distance detector; and a calculator which calculates a control luminance value for exposure control based on the first luminance information and the second luminance information when the first luminance information is above a predetermined threshold value, and calculates a control luminance value based on the first luminance information when the first luminance information is below the predetermined threshold value.

The camera may be further provided with an electronic flash; and an emission controller which controls the electronic flash to fire a flash when the first luminance information is below the predetermined threshold value.

The calculator may preferably calculate correction data for correcting a control luminance value based on a difference between the first luminance information and the second luminance information. The calculated correction data may be proportional with the difference between the first luminance information and the second luminance information.

It may be appreciated that the first spectral sensitivity lies substantially within a visible spectrum, and the second spectral sensitivity is skewed toward an outside of the visible spectrum.

According to another aspect of the present invention, a camera comprising: a distance detector which includes an image pick-up element having a spectral sensitivity skewed to an outside of a visible spectrum and operable to receive light from a predetermined region of a photographing view, and generates a distance information concerning a distance to an object based on the received light; a luminance detector which generates a luminance information for exposure control based on the received light of the distance detector; a memory which stores correction information for eliminating an error in the luminance information caused by the spectral sensitivity of the distance detector; and a corrector which corrects the luminance information based on the correction information.

The luminance detector may be provided with a reference adjusted based on the standard light source A. The correction information may be preferably a difference between a luminance information when the distance detector receives light from the standard light source A and a luminance information when the distance detector receives light from the standard light source B. Also, the correction information may be preferably a difference between a luminance information when the distance detector receives light from an object illuminated by the standard light source A and a luminance information when the distance detector receives light from an object illuminated by the standard light source B.

The camera may be further provided with a light source detector which detects kind of light source., wherein the memory stores a plurality of kinds of correction informations respectively corresponding to a plurality of kinds of light source, and the corrector corrects the luminance information based on a correction information corresponding to a detected light source kind. The light source detector may be made to judge based on a variation in image information sent from the distance detector at a predetermined period whether or not an instant light source is an artificial light source.

According to still another aspect of the present invention, a camera comprising: a distance detector which includes an image pick-up element for picking up an object, and generates a distance information concerning a distance to each of a plurality of first divisions of the picked up image; and a luminance calculator which calculates light measurement information for exposure control based on respective outputs of a plurality of second divisions of the picked up image, the second divisions being different from the first divisions.

It may be preferable that each of the second divisions is equal or smaller than each of the first divisions. The first divisions may include at least one of the second divisions.

The camera may be further provided with a memory which stores a light measurement information calculated by the luminance calculator. Further, the camera may be provided with a distance calculator which performs a calculation based on distance informations after the light measurement information is in the memory.

These and other objects, features and advantages of the present invention will become more apparent upon a reading of the following detailed description and accompanying drawings.

BRIEF DESCRIPTION OF THE DRAWINGS

FIG. 7 is a table used to select an SAE control area based on an AF control area and an object distance;

DETAILED DESCRIPTION OF THE PREFERRED EMBODIMENT OF THE INVENTION

An automatic exposure (AE) function of a camera according to an embodiment of the invention is described with reference to the accompanying drawings.

Figure 1:
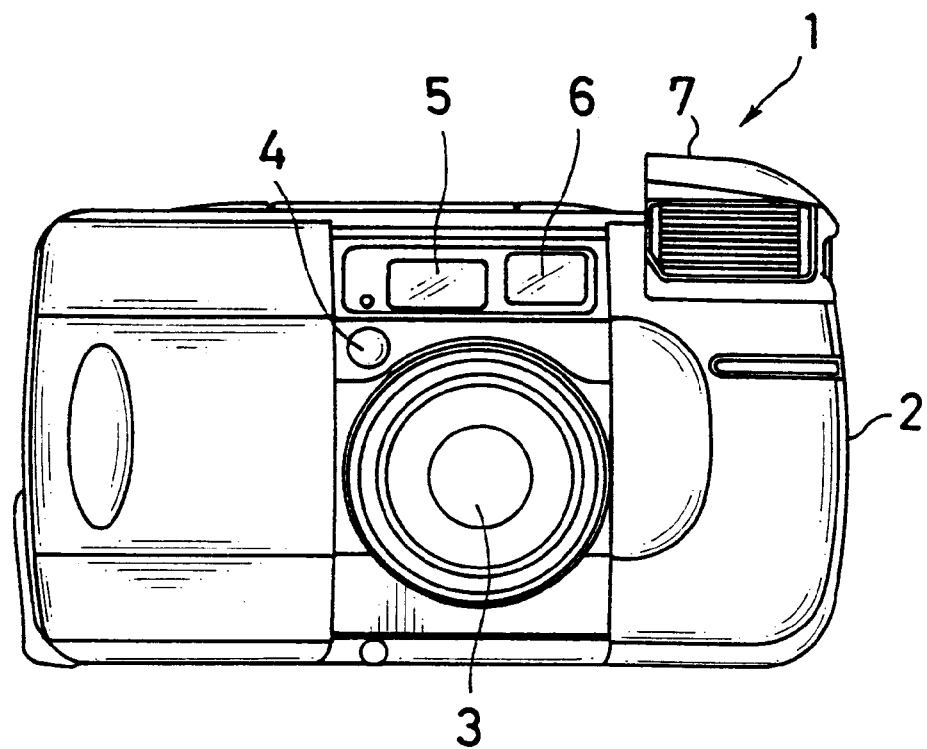
FIG. 1 is a front view of a camera according to the invention, showing its external configuration.

FIG. 1 is a front view of a camera 1 according to the embodiment showing its external configuration. The camera 1 includes an averaging detector for performing a light measurement by averaging an entire view to be photographed and a spot detector for performing a light measurement focused to the central part of the view to be photographed. An exposure control value for the photographing is automatically set based on an averaging detector information and a spot detector information. Further, a distance detecting sensor for automatic focusing (AF) acts as a light detecting sensor of the spot light detector.

The camera 1 is provided with a taking lens 3 substantially in the middle of the front surface of a camera main body 2 and a light detector 4 in a position obliquely above the taking lens 3 to the left. The taking lens 3 includes a zoom lens. In a lens system of the taking lens 3, there is provided a between-the-lens shutter formed by combining a plurality of shutter blades or leaves. A distance detector 5 is provided above the taking lens 3, and a viewfinder 6 is provided at the right side of the distance detector 5. Further, a built-in flash 7 of pop-up type is provided in a right upper corner of the camera main body 2.

Figure 2:
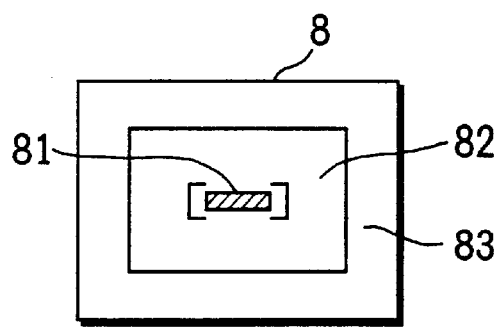
FIG. 2 is a diagram showing a distance detecting area within a viewfinder frame.
Figure 3:
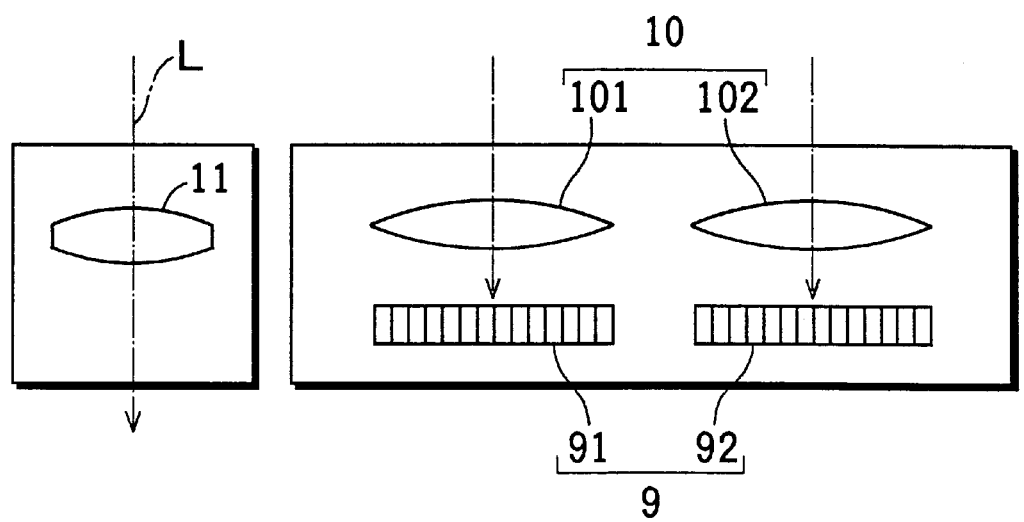
FIG. 3 is a diagram schematically showing a construction of a distance detector.

The light detector 4 includes an unillustrated first light receptor (hereinafter, "AE sensor") including SPCs (silicon photocells). The AE sensor is provided with a first light receiving portion for performing a light measurement for a peripheral area 83 of a viewfinder frame 8 and a second light receiving portion for performing a light measurement for a middle portion 82 of the viewfinder frame 8 as shown in FIG. 2. The light detector 4 calculates a light measurement data (luminance data of an object) for the entire viewfinder frame 8 based on the light measurement information for the respective light detecting areas 82, 83 obtained from light reception signals of the first and second light receiving portions. The AE sensor has an IR cut filter on its sensing surface so as to adjust its spectral sensitivity to lie within a visible spectrum.

The distance detector 5 has a distance detecting area 81 substantially in the center of the viewfinder frame 8, and detects a distance to an object (hereinafter, "object distance") D (m) based on an image information obtained by receiving a light reflected by the object fallen within this area 81. The distance detector 5 is provided with an AF sensor 9 mainly including a pair of line image sensors 91, 92, and a lens system 10 including a pair of fine lens arrays 101, 102 arranged before the line image sensors 91, 92. The line image sensors 91, 92 are spaced apart by a specified distance on the same line. The line image sensors 91, 92 are each constructed, for example, by a CCD line sensor in which a multitude of charge coupled devices (hereinafter, "pixels") are linearly arranged. The distance detector 5 picks up a part of an object image by the respective line image sensors 91, 92 and detects the object distance D (m) using data representing the picked up images (data output from the respective pixels; hereinafter, "pixel data").

A sensing portion of the line image sensor 91 closer to an optic axis L of a viewfinder optical system 11 acts as a reference portion, whereas a sensing portion of the line image sensor 92 more distanced from the optic axis L acts as a comparison portion. The object distance D is calculated based on a displacement of line images from the reference portion and the comparison portion.

The line image sensor 91 of the distance detector 51 also acts as a light detecting sensor used for performing a spot light measurement focused to the central portion of the viewfinder frame 8. As described later, a light measurement data for the central portion of the viewfinder frame 8 is calculated based on the pixel data constituting the line image from the reference portion. The line image sensor 92 may be used as the light detecting sensor. However, in order to maximally reduce a parallax between a view area of the viewfinder optical system 11 and a light detecting area of the AF sensor 9, the line image sensor 91 closer to the optic axis L of the viewfinder optical system 11 is used as the spot detecting sensor in this embodiment.

Figure 4:
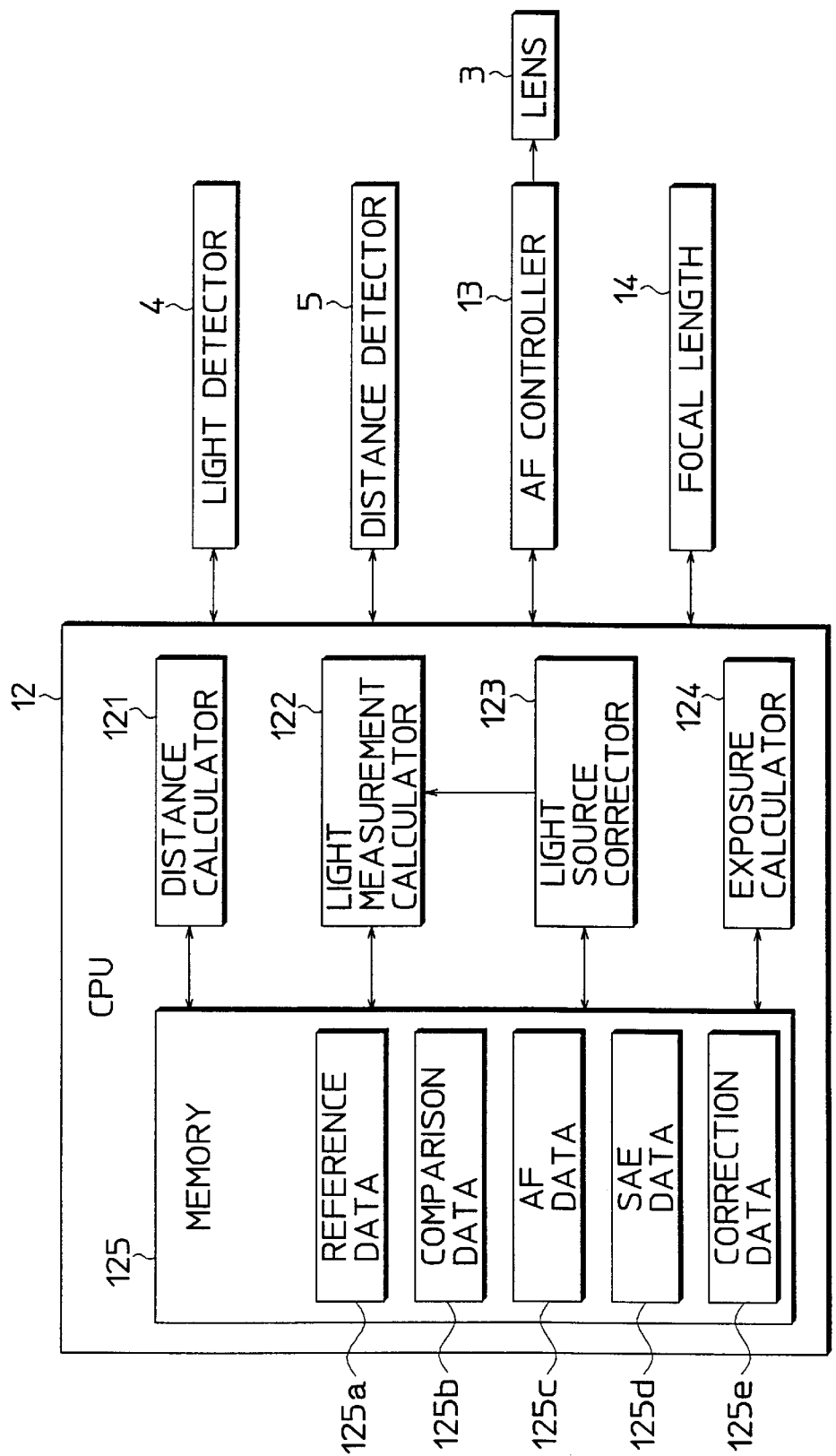
FIG. 4 is a block diagram of a control system for the light measurement and the distance measurement of the camera.

FIG. 4 is a block diagram of a control system of the camera for the light measurement and the distance measurement.

In FIG. 4, a CPU 12 is a microcomputer for centrally controlling a series of photographing operations of the camera including the AF, AE and exposure. The CPU 12 is provided internally with a distance calculator 121 for the AF control, a light measurement calculator 122 for calculating a light measurement data for the central portion of the viewfinder frame 8, a light source corrector 123, an exposure calculator 124 for calculating a light measurement information for an exposure control, and a memory 125 used for the above calculations.

The memory 125 includes a reference portion data area 125a, a comparison portion data area 125b, an AF data area 125c, an SAE data area 125d and a correction data area 125e. The pixel data constituting the line image of the object picked up by the line image sensor 91 (hereinafter, "reference portion data"), and the pixel data constituting the line image of the object picked up by the line image sensor 92 (hereinafter, "comparison portion data") are stored in the reference portion data area 125a and the comparison portion data area 125b, respectively. A data concerning the object distance which is calculated based on the reference portion data and the comparison portion data (hereinafter, "AF data") is stored in the AF data area 125c. A data concerning the luminance of the object in the central portion of the viewfinder frame 8 which is calculated based on the reference portion data (hereinafter, "SAE data") is stored in the SAE data area 125d. Further, preset correction data concerning a light source illuminating the object are stored in the correction data area 125e.

In the case that the light source illuminating the object differs from an adjustment light source of the AF sensor 9, an error occurs in a control luminance value (hereinafter, "SAE control data") for the light detecting area in the central portion of the viewfinder frame (hereinafter, "spot detecting area") which is calculated based on the SAE data. The correction data is used to correct this error in accordance with the light source illuminating the object. This correction is described in detail later.

The sensing region of each of the reference portion and the comparison portion are divided into a plurality of AF areas. The AF data are calculated for the respective AF areas and stored in the AF data area 125c in correspondence with the AF areas. The sensing region of the reference portion is also divided into a plurality of AE areas. The SAE data are calculated for the respective AE areas and stored in the SAE data area 125d in correspondence with the AE areas.

Figure 5:
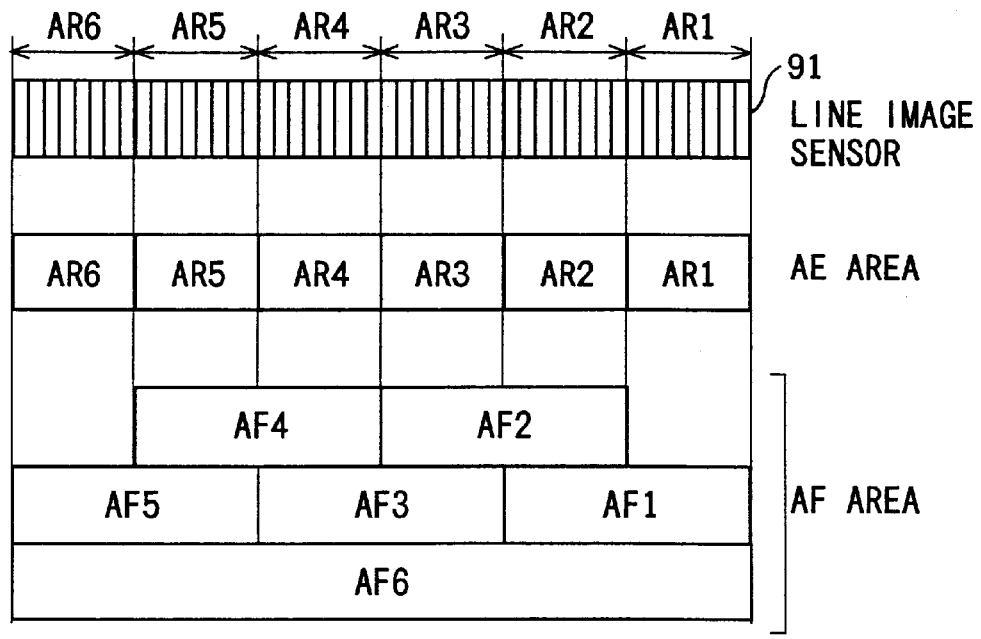
FIG. 5 is a diagram showing an example of AF areas and AE areas set in a sensing region of a line image sensor as a reference portion.

FIG. 5 is a diagram showing an example of the AF areas and the AE areas set in the sensing region of the line image sensor 91.

There are set six AE areas and six AF areas in the sensing region of the line image sensor 91. The AE areas AE1 to AE6 are formed by evenly dividing the sensing region of the line image sensor 91 into 6 areas. Further, the AF areas AF1 to AF6 are formed by combining divided areas AR1 to AR6 obtained by evenly dividing the sensing region of the line image sensor 91 as follows: AF1=AR1+AR2; AF2 =AR2+AR3; AF3=AR3+AR4; AF4=AR4+AR5; AF5=AR5 +AR6; and AF6=AR1+AR2+AR3+AR4+AR5+AR6.

Since the respective AE areas AE1 to AE6 correspond to the divided areas AR1 to AR6 in this embodiment, the respective AF areas AF1 to AF6 are formed by combing the AE areas AE1 to AE6. This arrangement is made to enable the detection of the SAE data for the object image within the selected AF area in the case that the AF control is executed by selecting any one of the AF areas AF1 to AF6 and to perform an exposure control based on the detected SAE data.

Provided AF areas and AE areas are such that the smallest AE area has substantially equal to or smaller than the smallest AF area and at least one AE area is substantially completely included in each AF area, the sensing region of the line image sensor 91 may be divided according to another method to form the AE areas and the AF areas. The substantially complete inclusion of at least one AE area in each AF area means as follows. In the case that, even if the AE area is slightly larger than the AF area, a portion of the AE area bulging out of the AF area does not influence the SAE data in the AE area corresponding to this AF area, the size of the AE area can be handled equivalent to the size of the AF area in obtaining the SAE data. In such a case, no strict size relationship between the AE areas and the AF areas is necessary.

Referring back to FIG. 4, the distance calculator 121 calculates the AF data for each of the AF areas AF1 to AF6 using the reference portion data and the comparison portion data, and the calculation results thereof are stored in addresses of the memory 125 corresponding to the respective distance detecting areas or AF areas AF1 to AF6. The light measurement calculator 122 calculates the SAE data for each of the AE areas AE 1 to AE6 using the reference portion data; calculates an SAE control data corresponding to the spot detecting area using the SAE data corresponding to the AF area selected for the AF control; and stores the calculation results in addresses of the memory 125 corresponding to the respective distance detecting areas AE1 to AE6.

The SAE data are calculated and stored before the AF data are calculated so as not to influence the calculation of the AF data. Accordingly, even if the AF sensor 9 is used also as the AE sensor for the spot detector, an increase in the storage areas for the calculated SAE data and AF data can be maximally suppressed. More specifically, the AF data is obtained by calculating a correlation value of the reference portion data and the comparison portion data after the reference portion data and the comparison portion data are converted into a difference data, a luminance center (center of gravity) data, or the like. Thus, if the AF data and the SAE data are calculated independently of each other, the reference portion data and the comparison portion data need to separately be stored for the calculation of the SAE data. However, in this embodiment, the storage of the reference portion data and the comparison portion data is eliminated by calculating the SAE data before the calculation of the AF data, thereby suppressing an increase of the memory capacity. Further, since one SAE data is calculated for each of the AE areas AE1 to AE6, only six SAE data are required for the calculation of the SAE control data. In this way, the memory storage for storing the SAE data and the SAE control data is maximally reduced.

The light source corrector 123 corrects an error in the calculated SAE control data based on the light source illuminating the object and, specifically, adds the above correction data to the calculated SAE control data. The exposure calculator 124 calculates a light measurement information for the exposure control based on the light measurement data for the entire viewfinder frame obtained by the light detector 4 and the SAE control data. An AF controller 13 controls the drive of the taking lens 3 to attain an in-focus condition of the taking lens 3. A focal length detector 14 detects the focal length of the taking lens 3.

Next, the calculation of the AF data and the SAE control data by the AF sensor 9 using a picked up image is described.

Figure 6:
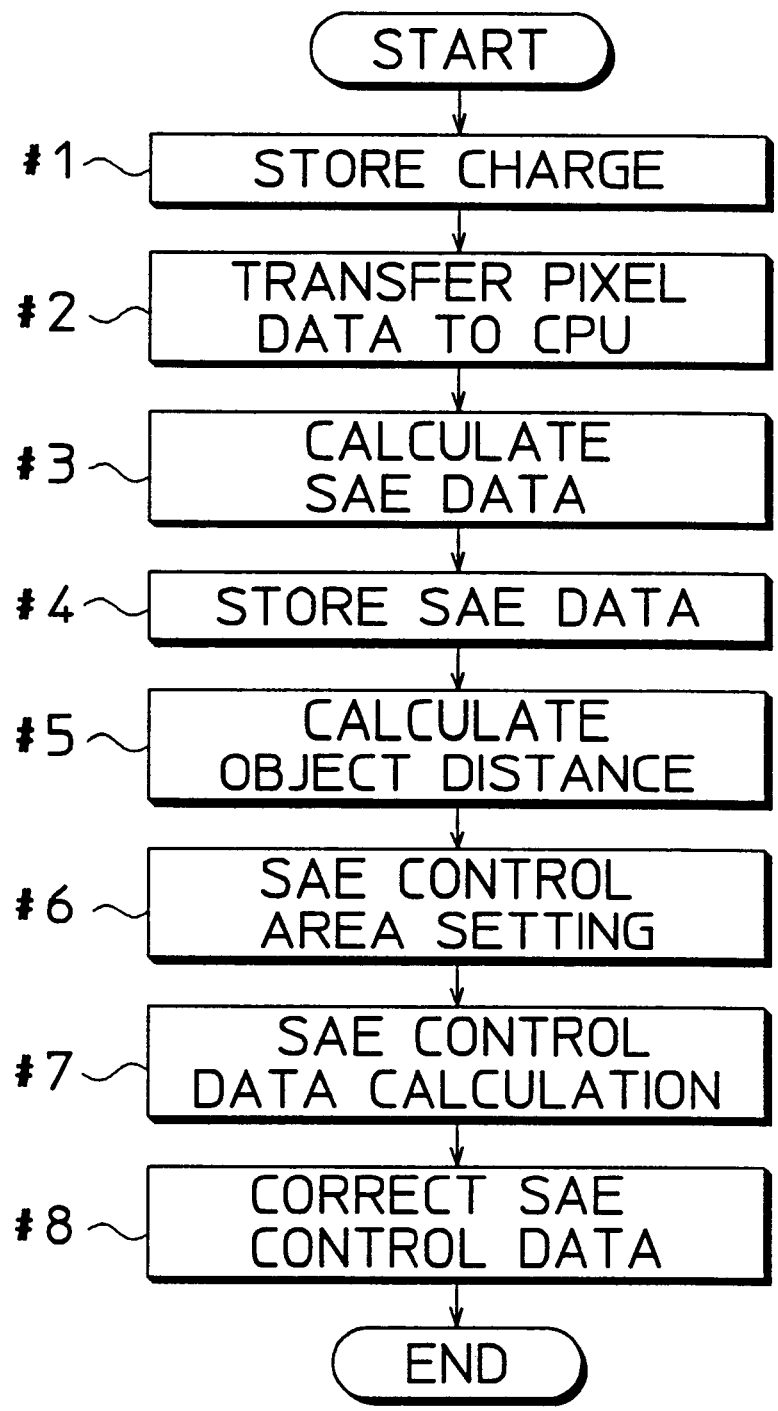
FIG. 6 is a main flowchart showing a control for calculating an AF data and an SAE data by an AF sensor using a picked up image.

FIG. 6 is a main flowchart of a control for the calculation of the AF data and the SAE data by the AF sensor using the picked up image. This routine is executed during the photographing preparation performed when a shutter release button is pressed halfway.

First, the AF sensor 9 is driven for a predetermined time to store electric charges corresponding to an amount of received light in the respective pixels of the line image sensors 91, 92 (Step #1). All pixel data of the line image sensors 91, 92 are transferred to the CPU 12; the pixel data of the reference portion are stored in the reference portion data area 125a of the memory 125; and the pixel data of the comparison portion are stored in the comparison portion data area 125b of the memory 125 (Step #2).

Subsequently, the reference portion data are read from the reference portion data area 125a of the memory 125 for each of the AE areas AE1 to AE6 and the SAE data $D_{AE1}$ to $D_{AE6}$ corresponding to the respective AE areas AE1 to AE6 are calculated (Step #3). For the calculation of the SAE data $D_{AE1}$ to $D_{AE6}$, a variety of methods shown in TABLE-1 below can be adopted. Data contents in TABLE-1 are calculated in accordance with operational expressions shown in TABLE-1.

TABLE 1

| DATA CONTENTS | OPERATIONAL EXPRESSION |
| --- | --- |
| (1) Average Value 1 | $D_{AE} = \Sigma\, g(i)/n$ |
| (2) Average Value 2 | $D_{AE} = \{\Sigma\, g(i)\text{-Max}(g(i))\text{-Min}(g(i))\}/(n-2)$ |
| (3) Average Value 3 | $D_{AE} = \Sigma\, g'(i)/n'$ |
| (4) Average Value 4 | $D_{AE} = \Sigma\, g''(i)/n''$ |
| (5) Minimum Value | $D_{AE} = \text{Min}(g(i))$ |
| (6) Maximum Value | $D_{AE} = \text{Max}(g(i))$ |

Note:
(1) g(i), n denote the i-th pixel data included in the AE area and a total number of the pixels included in the AE area, respectively.
(2) Max(g(i)) denotes a pixel data having a maximum luminance within the AE area.
(3) Min(g(i)) denotes a pixel data having a minimum luminance within the AE area.
(4) g'(i), n' denote pixel data having a luminance equal to or smaller than a predetermined threshold value and the number of such pixel data within the AE area, respectively.
(5) g''(i), n'' denote pixel data having a luminance equal to or larger than a predetermined threshold value and the number of such pixel data within the AE area, respectively.
(6) The predetermined threshold value is set based on an average light measurement value of the light detector 4.

In TABLE-1, a method "average value 1" is such that an arithmetic average value of all pixel data within the AE area is used as the SAE data of the AE area. Since the luminance of the entire area is averaged according to the method "average value 1", a proper exposure control is possible when the luminance within the area is in a specific range. A method "average value 2" is such that an arithmetic average value of all pixel data within the AE area except the pixel data representing maximum and minimum luminance values is used as the SAE data of this AE area. Since the influences of extremely bright and dark parts can be eliminated according to the method "average value 2" in the case that the luminance within the area varies beyond the specific range, a proper exposure control is possible even in such a case. The method "average value 2" is an improvement of the method "average value 1".

A method "average value 3" is such that an arithmetic average value of the pixel data, out of the pixel data within the AE area, which represent a luminance equal to or smaller than a specified threshold value set in accordance with an average light measurement value is used as the SAE data of this AE area. A method "average value 4" is such that an arithmetic average value of the pixel data, out of the pixel data within the AE area, which represent a luminance equal to or larger than a specified threshold value set in accordance with an average light measurement value is used as the SAE data of this AE area. According to these methods, an operation for the AE control can be simplified. More specifically, since the bright and dark parts are extracted based on the threshold value set in accordance with the average light measurement value according to the methods "average value 3" and "average value 4", respectively, it is not necessary to separately determine whether a photographic scene is back lit after the calculation of the SAE data. Thus, the operation for calculating the SAE control data using the AE data can be simplified.

A method "minimum value" is such that, out of the pixel data within the AE area, the pixel data representing a minimum luminance is used as the SAE data of this AE area, whereas a method "maximum value" is such that, out of the pixel data within the AE area, the pixel data representing a maximum luminance is used as the SAE data of this AE area. The method "minimum value" is suited to the case where the exposure control is intended to cause an overexposure, whereas the method "maximum value" is suited to the case where the exposure control is intended to cause an underexposure.

Subsequently, after the calculated SAE data is stored in the SAE data area 125d of the memory 125 (Step #4), the AF area for the AF control (AF area used for the AF control; hereinafter, "AF control area") and the object distance D for the object in the AF control area are calculated using the reference portion data and the comparison portion data stored in the memory 125, and the calculation results are stored in the AF data area 125c of the memory 125 (Step #5). The object distance D is calculated from a correlation value obtained by, after converting the reference portion data in the reference portion data area 125a and the comparison portion data in the comparison portion data area 125b into, e.g., difference data or luminance center (center of gravity) data, comparing the reference portion data and the comparison portion data for each AF area. For example, out of the AF areas AF1 to AF6, the AF area in which the object distance D is shortest is selected as the AF control area.

Subsequently, the AE area used for the calculation of the SAE control data (hereinafter, "SAE control area") is set based on the AF control area and the object distance D (Step #6).

FIG. 7 is an example of a table used to select the SAE control area based on the AF control area and the object distance D.

In FIG. 7, "1", "2", ... "6" in the row of "AE area" denote AE1, AE2, ... AE6, respectively, whereas "1", "2", ... "6" in the column of "AF area" denote AF1, AF2, ... AF6, respectively. "All Low Contrast" is a case where a focusing condition cannot be detected because contrast was low in all AF areas AF1 to AF6. Further, "●" denotes the selected AE area and "–" denotes the AE area which were not selected. Furthermore, "a", "b", and "c" in the row of "OBJECT DISTANCE" denote threshold values for dividing a range of the object distance D into three sub-ranges.

According to a method for selecting the AE area which is shown in FIG. 7, a range of the object distance D is divided into three sub-ranges "short distance", "middle distance" and "long distance" so that the shorter the object distance D, the more the selection range of the SAE control area is widened in stages even if the same AF area is selected as the AF control area. For example, the AF area AF3 is selected as the AF control area, the AE areas AE3, AE4 included in the AF area AF3 are selected as the SAE control area when the object distance D lies in the "long distance" range; the AE areas AE2, AE5 outside the AF area AF3 are added to the SAE control area when the object distance D lies in the "middle distance" range; all AE areas AE1 to AE6 are selected as the SAE control area when the object distance D lies in the "short distance" range.

It is preferable that the SAE control area be maximally wide. When the object is at a long distance from the camera, the size of the object image with respect to the viewfinder frame 8 is small (see FIG. 8). If the SAE control area includes the AE areas outside the AF control area, the object image as well as the background image are included in this SAE control area, and the SAE control data calculated based on the SAE data within the SAE control area may be influenced by the luminance of the background. Accordingly, the AE areas within the AF control area are selected as the SAE control area, the size of the object image with respect to the viewfinder screen 8 increases in stages when the object is at a middle or short distance from the camera. In this case, even if the SAE control area includes the AE areas outside the AF control area, the background image is unlikely to be included in the SAE control area and the AE control data is thought to be unlikely to be influenced by the luminance of the background. Accordingly, when the object is at a middle or short distance from the camera, the AE areas outside the AF control are selected as the SAE control area.

Further, since the control is so performed as to enable photographing in the case of low contrast in this embodiment, the SAE control data can be calculated using the AE areas AE1 to AE6 as the SAE control area even in the case of "All Low Contrast" or in the case of selecting the AF area AF6 which is close to the "All Low Contrast" case.

If the position of the spot detector for the object is fixed, the maximum size of the SAE control area needs to be changed according to the position of the spot detector for the object (i.e. object distance D) in order to obtain an accurate AE control data because the size of the object image within the viewfinder frame becomes smaller as the object distance D becomes longer.

Figure 9:
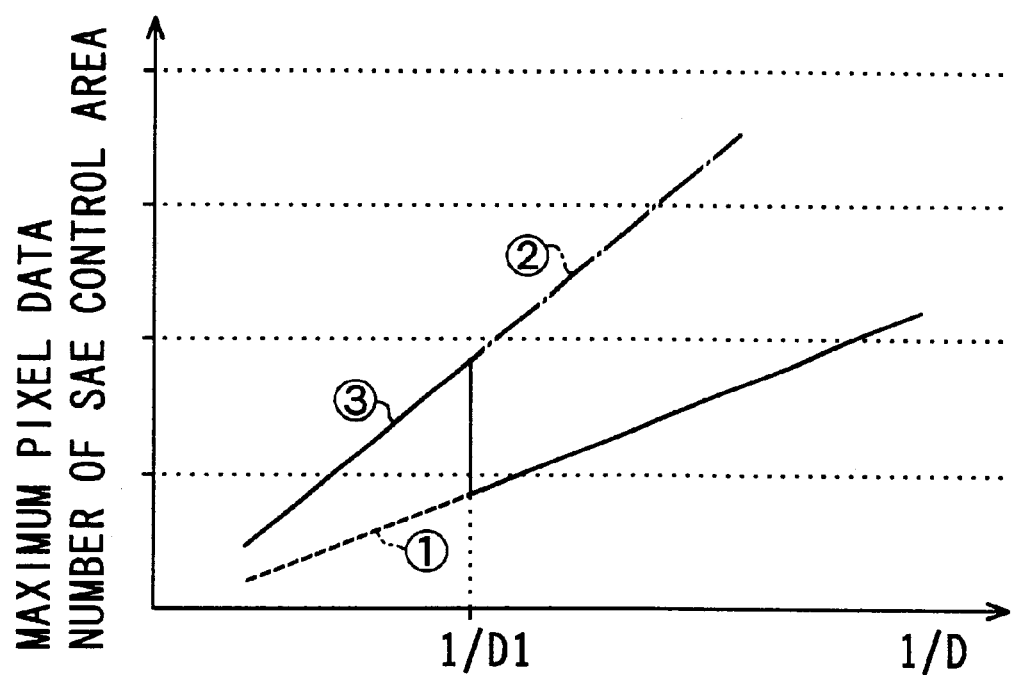
FIG. 9 is a graph showing a maximum number of pixel data of a preferable SAE control area in relation to the object distance.

For example, in the case that a person of average size is assumed to be an object and his face is set as the position of the spot detector, a relationship between the object distance D and the maximum pixel data number of the suitable SAE control area is defined by a dotted line ① of FIG. 9. In the case that the trunk of the person is set as the position of the spot detector, a relationship between the object distance D and the maximum pixel data number of the suitable SAE control area is defined by a phantom line ②. Accordingly, in the case that a man's face is assumed as the position of the spot detector and the maximum size of the SAE control are is set in accordance with the object distance D, the size of the SAE control area is considerably small when the object distance is long.

Figure 8A:
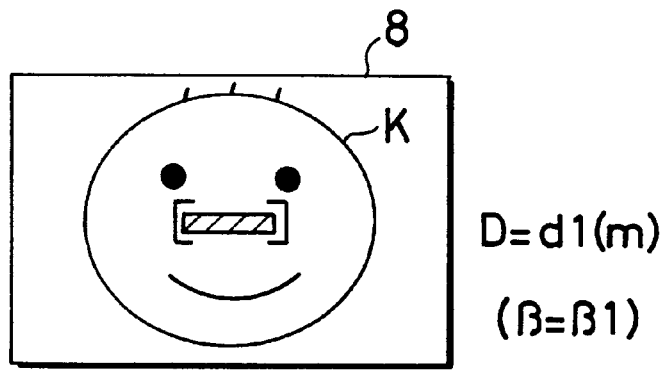
FIGS. 8A to 8C are diagrams showing the positions of a spot detector by a distance detecting sensor at the respective object distances.
Figure 8B:
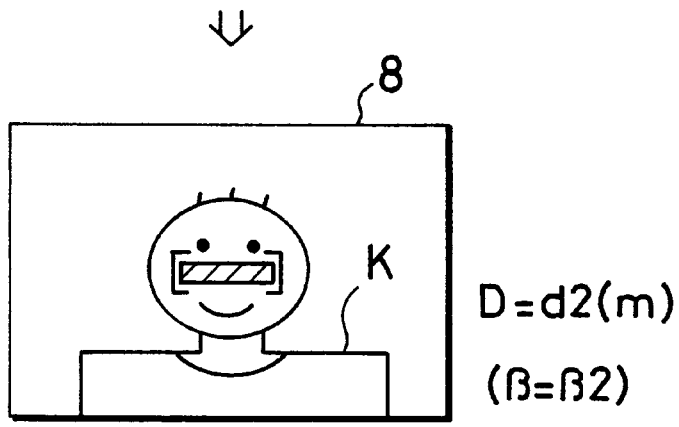
Figure 8C:
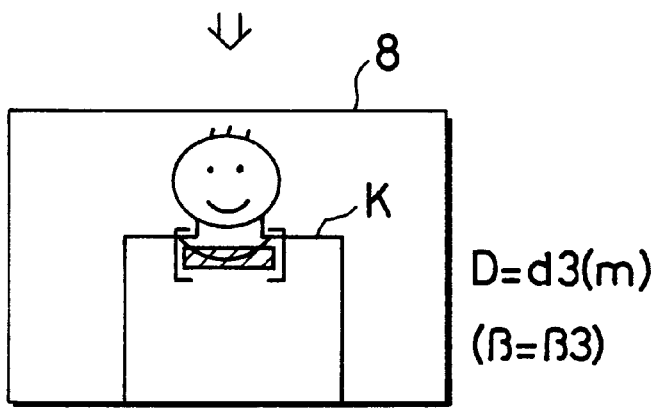

However, in the case that the object is a person, a camera operator frames a view as shown in FIG. 8 such that an image of the face of an object K is generally located in the center of the viewfinder frame 8 when the object distance D is short and an image of the object K is maximally included within the viewfinder frame 8 when the object distance D is long. In this way, since the position of the spot detector for the object K changes depending upon the object distance D, the spot detector needs to be directed at the face of the object image K which is at a distance shorter than a predetermined distance DI from the camera. For the object K which is at a distance longer than the predetermined distance D1 from the camera, the spot detector can be directed at the trunk of the object K.

Accordingly, the maximum pixel data of the SAE control area suited to the object distance D is switched from the line ① to the line ② at the predetermined distance D1 in FIG. 9, and can be increased as defined by the line ② at a distance longer than the predetermined distance D1. The above is considered for the selection of the range of the SAE control area in FIG. 7. Even if the object is at a long distance from the camera, two AE areas included in the AF control area are selected as the SAE control area so as to obtain a suitable SAE control data by maximally expanding the SAE control area.

A relationship defined by line ③ in FIG. 9 (a relationship obtained by combining the relationships ① and ② so that the line ① is switched to the line ② at the predetermined distance D1) gives the maximum pixel data number of the SAE control area. In a range below this pixel data number, the SAE control area is less likely to be influenced by the background. Since the spot detector is performed using the distance detector 5 of external light type in this embodiment, the SAE control is set based on the object distance D. In the case that the distance detector 5 is of TTL (through the lens)

type, the SAE control may be set based on a magnification β instead of based on the object distance D.

Figure 10:
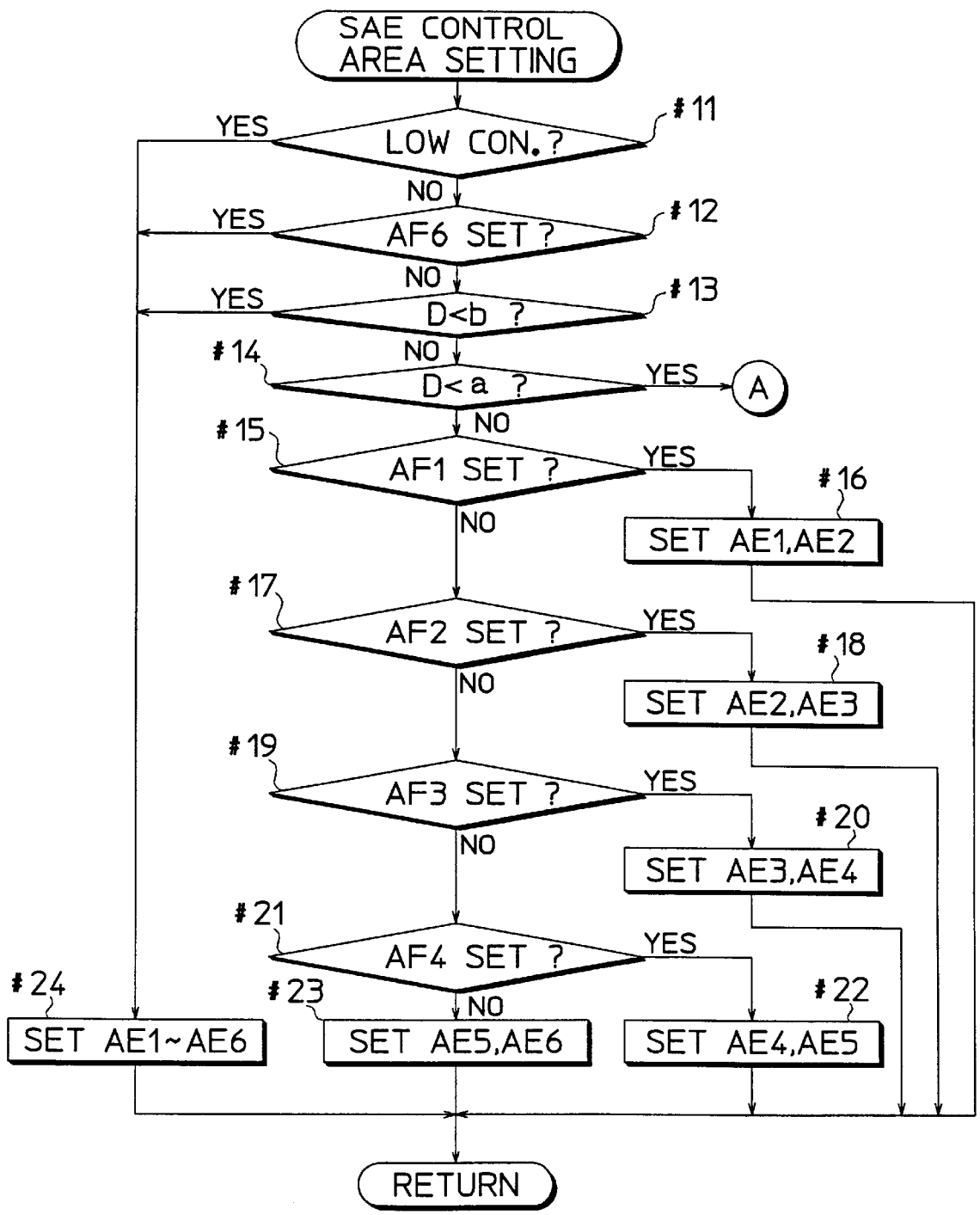
FIGS. 10 and 11 are a flowchart showing a subroutine "SAE Control Area Setting"
Figure 11:
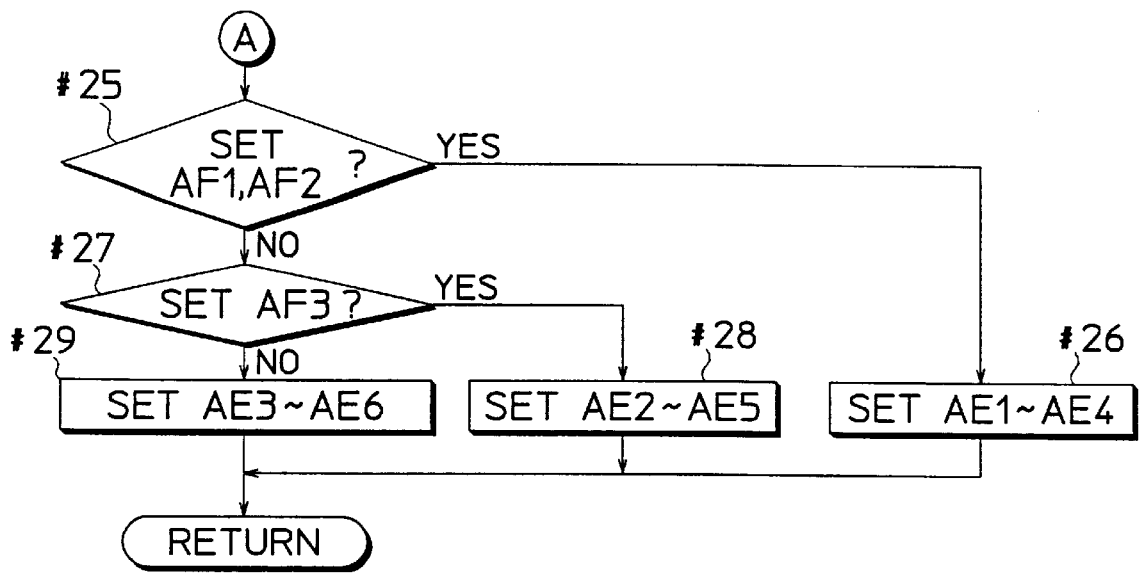

FIGS. 10 and 11 show a subroutine "SAE Control Area Setting" for selecting the SAE control area based on the AF control area and the object distance D, i.e. show an procedure of the SAE control area selecting method shown in FIG. 7.

First, whether contrast is low in all AF areas and whether the AF area AF6 is set as the AF control area are judged (Steps #11, #12). If contrast is low in all AF areas or if the AF area AF6 is set as the AF control area (YES in Steps #11, #12), the distance range of the object is judged based on the object distance D (Steps #13, #14). Specifically, if the object distance D is "short" (D<b) (YES in Step #13), the AE areas AE1 to AE6 are set as the SAE control area (Step #24) and this routine returns. If the object distance D is "long" (a≦D) (NO in Step #14), it is successively judged whether the AF areas AF1 to AF4 have been selected as the AF control area (Steps #15, #17, #19, #21).

If the AF area AF1 is set as the AF control area (YES in Step #15), the AE areas AE1, AE2 are set as the SAE control area (Step #16). If the AF area AF2 is set as the AF control area (YES in Step #17), the AE areas AE2, AE3 are set as the SAE control area (Step #18). If the AF area AF3 is set as the AF control area (YES in Step #19), the AE areas AE3, AE4 are set as the SAE control area (Step #20). If the AF area AF4 is set as the AF control area (YES in Step #21), the AE areas AE4, AE5 are set as the SAE control area (Step #22). Then, this subroutine returns. If none of the AF areas AF1 to AF4 has been selected, i.e. the AF area AF5 is selected as the AF control area (NO in Step #21), the AE areas AE5, AE6 are set as the SAE control area (Step #23) and this subroutine returns.

If the object distance D is "a middle distance" (b≦D<a) (YES in Step #14), it is judged whether the AF area AF1 or AF2 is selected as the AF control area (Step #25). If the AF area AF1 or AF2 is set as the AF control area (YES in Step #25), the AE areas AE1 to AE4 are set as the SAE control area (Step #26) and this subroutine returns. If neither the AF area AF1 nor the AF2 is set as the AF control area (NO in Step #25), it is then judged whether the AF area AF3 is set as the AF control area (Step #27). If the AF area AF3 is set as the AF control area (YES in Step #27), the AE areas AE2 to AE5 are set as the SAE control area (Step #28). If the AF area AF3 is not set as the AF control area (NO in Step #27), the AE areas AE3 to AE6 are set as the SAE control area (Step #29) and this subroutine returns.

Referring back to the flowchart of FIG. 6, upon the completion of setting of the SAE control area, the SAE control data is calculated using the SAE data within the set SAE control area (Step #7).

Figure 12:
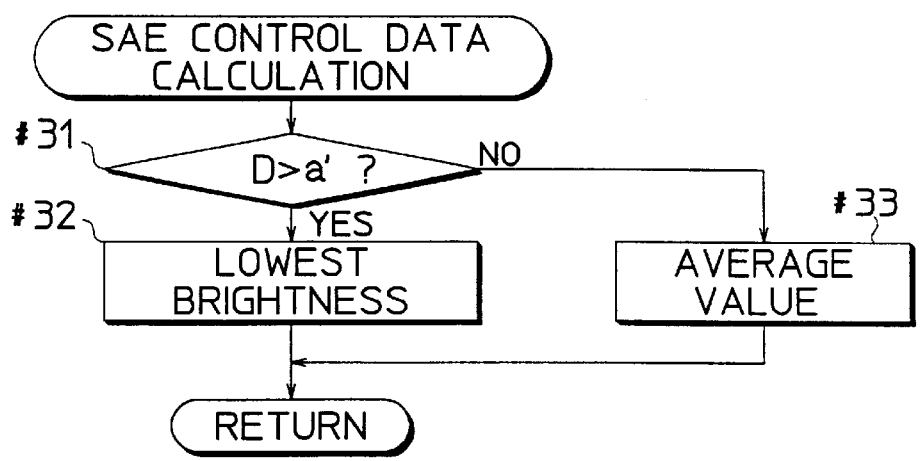
FIG. 12 is a flowchart showing a subroutine "SAE Control Data Calculation"

FIG. 12 is an example of a subroutine "SAE Control Data Calculation" according to which the calculation method of the SAE control data is switched according to the object distance D. Specifically, it is judged whether the object distance D is longer than a suitable predetermined distance a' (>a) of e.g. 4 m or longer (Step #31). If the object distance D is longer than the predetermined distance a' (YES in Step #31), a lowest luminance value min {B1, B2, . . . } of luminance values B1, B2, . . . of the AE areas selected as the SAE control area is set as the SAE control data (Step #32). If the object distance D is equal to or shorter than the predetermined distance a' (NO in Step #31), an average value $B_{AVE}$ (=Σi/m, Bi:i-th luminance value, m: the number of the luminance values) of the luminance values B1, B2, . . . of the AE areas selected as the SAE control area (Step #33) and this subroutine returns.

If the object is at a long distance from the camera, the object image in the viewfinder frame 8 is small, the edge of the object image becomes more influential. In view of this, according to the above method, the influence of the edge of the object image is reduced by using the lowest luminance value as the SAE control data if the object distance D is longer than the predetermined distance a'. In such a case as well, whether the object is at a short or long distance from the camera can be judged based on the magnification β instead of based on the object distance D.

Further, independently of the object distance D, the SAE control data may be calculated in accordance with a specific operational expression, e.g. one of the methods (1) to (5) in TABLE-1.

Since the luminance within the SAE control area is averaged according to the method "average value 1", a variation of the calculation results can be reduced even in the case that the SAE control data is calculated based on a maximally wide area. The method "average value 2" is an improved method of the method "average value 1" and is designed to reduce the influence of abnormal values even in the case that the luminance varies over an excessively large range. Further, the method "minimum value" has an advantage of more easily effecting a judgment as to whether the object is in back lit condition (back-light judgment) than the method "average value 1" in the case that the judgment is made by comparing the light measurement data for the entire viewfinder screen obtained by the light detector 4 and the SAE control data. The methods "average value 3" and "average value 4" have an advantage of easily and accurately making the back-light judgment since the bright and dark parts are extracted on the basis of the threshold value based on the light measurement value, respectively.

Referring back to FIG. 6, when the SAE control data is calculated, it is corrected using the correction data stored in the correction data area 125e (Step #8). This correction is made to correct an error in the SAE control data which occurs when the light source illuminating the object differs from the adjustment light source of the AF sensor 9, based on the light source.

Figure 13:
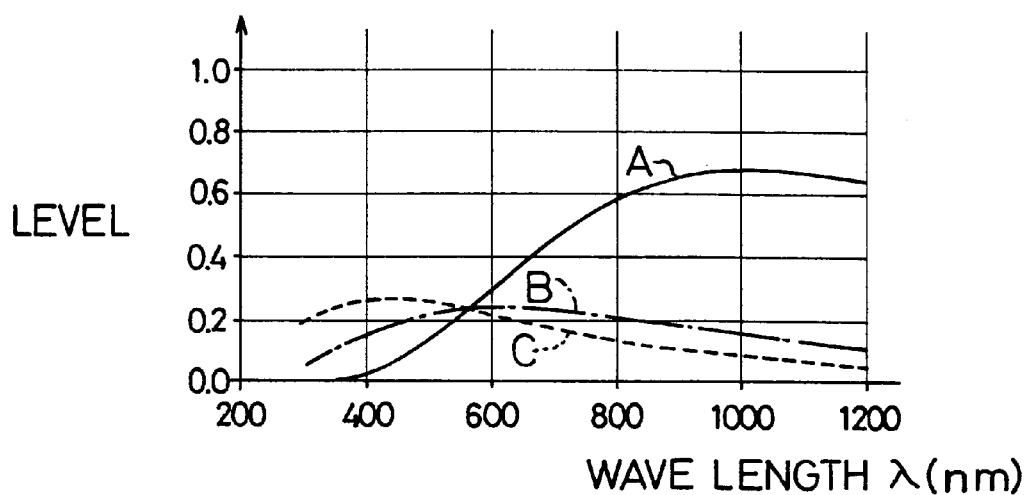
FIG. 13 is a graph showing spectral characteristics of standard light sources A, B, and C.
Figure 14:
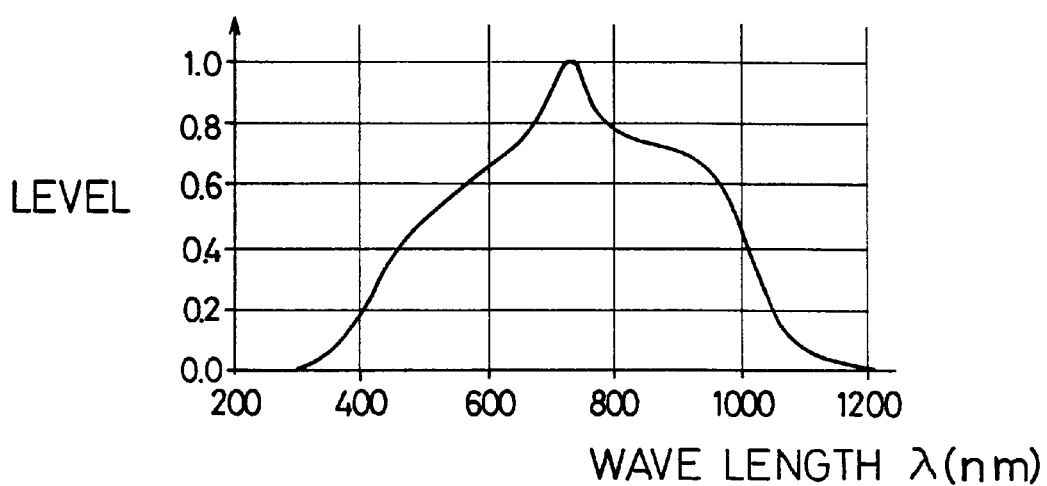
FIG. 14 is a graph showing a distribution of the relative sensitivity of the AF sensor.
Figure 15:
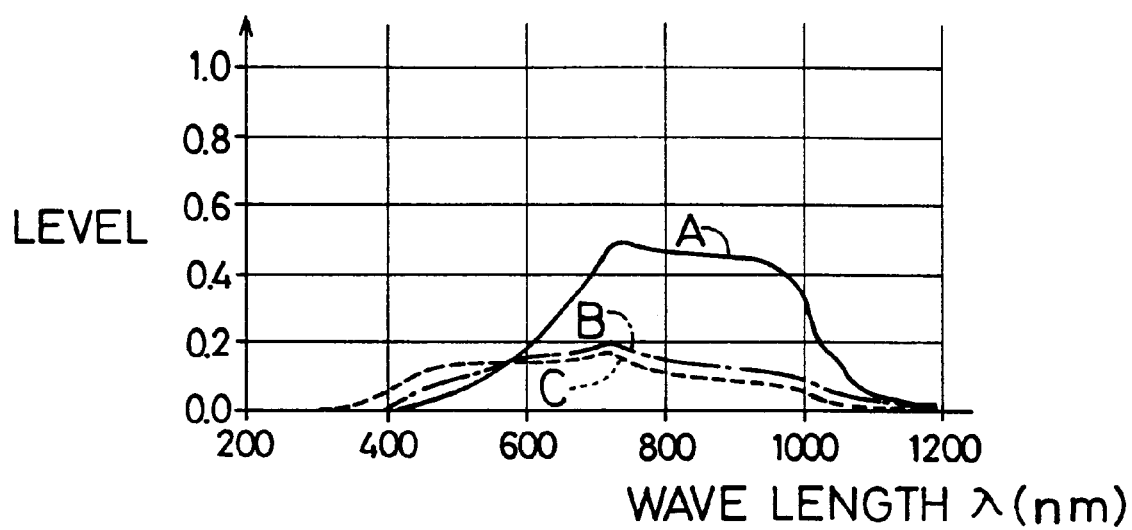
FIG. 15 is a graph showing a light receiving characteristic of the AF sensor in response to the standard light sources.

Standard light sources A, B and C used for color measurement have spectral characteristics as shown in FIG. 13, respectively. The spectral characteristic of the standard light source A is fairly skewed toward the infrared spectrum as compared with the standard light sources B, C. On the other hand, the SPCs arranged as photoelectric conversion elements on the sensing surfaces of the line image sensors 91, 92 have, for example, a relative sensitivity factor distribution as shown in FIG. 14. Outputs of the SPCs when they receive the light from the standard light sources A, B and C are as shown in FIG. 15. The outputs of the SPCs in response to the standard light sources B, C are below the half of those in response to the standard light source A.

In the case that the AF sensor 9 is used also as the AE sensor for the spot detecting area, the light measurement value obtained by the AF sensor 9 and the light measurement value obtained by the AE sensor of the light detector 4 need to be leveled. Since the output characteristic of the AE sensor of the light detector 4 is normally adjusted based on the standard light source A, the output characteristic of the AF sensor 9 is also adjusted based on the standard light source A.

Thus, if picture taking is performed outdoors using a sun light as a light source, since the actual light source (closer to the standard light sources B, C) differs from the light source (standard light source A) based on which the output characteristic of the AF sensor 9 is adjusted, the SAE control data obtained based on the output of the AF sensor 9 is smaller than an actual luminance value. The above correction is made to correct the output level of the AF sensor 9 in consideration of the light source illuminating the object. For this correction, in the correction data area 125e of the memory 125 are stored a correction data $\Delta B_B (\approx 1.21$ EV) used to correct a difference between the output of the AF sensor 9 when the light from the standard light source A is received and the one when the light from the standard light source B is received and a correction data $\Delta B_C (\approx 1.51$ EV) used to correct a difference between the output of the AF sensor 9 when the light from the standard light source A is received and the one when the light from the standard light source C is received.

Specifically, the correction is made by adding the correction data $\Delta B_B$ or $\Delta B_C$ to the SAE control data.

In the flowchart of FIG. 6, outdoors photographing under the sun light is assumed to be standard photographing, and the correction is always made by adding the correction data $\Delta B_B$ or $\Delta B_C$ to the SAE control data. However, the camera is preferably provided with a light source detecting function so as to correct the SAE control data in accordance with the detected light source.

Figure 16:
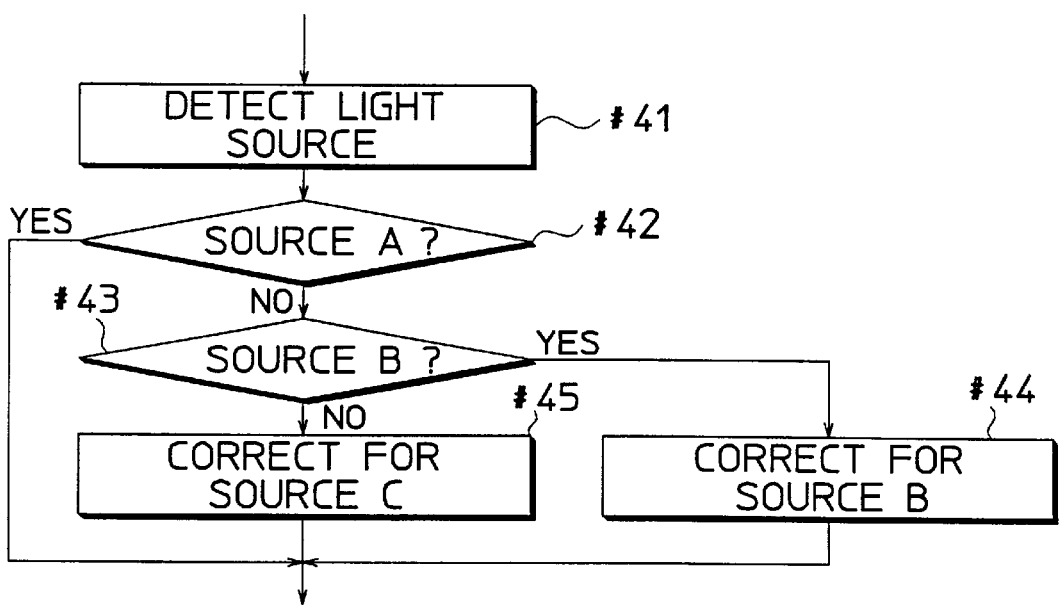
FIG. 16 is a flowchart showing a correction processing for the SAE control data according to the detected light source.

In such a case, a processing shown in FIG. 16 is performed instead of Step #8. Specifically, after the calculation of the SAE control data, the light source illuminating the object is detected (Step #41). It is then judged whether the detected light source is the standard light source A or the standard light source B (Steps #42, #43). If the detected light source is the standard light source A (YES in Step #42), this processing ends without making any correction. If the detected light source is the standard light source B (YES in Step #43), the correction data $\Delta B_B$ is added to the SAE control data (Step #44). If the detected light source is the standard light source C (YES in Step #43), the processing ends after adding the correction data $\Delta B_C$ to the SAE control data (Step #45).

The light source detection may be performed as follows. A light detecting sensor for white balance is, for example, provided at the camera. The light source is directly detected based on color component data of R (red), G(green) and B(blue) output from this light detecting sensor. Alternatively, the AF sensor 9 may be driven at a frequency higher than a flicker cycle of a fluorescent lamp, and only a judgment as to whether or not the light source is a fluorescent lamp may be made by checking the presence of a sampling level variation.

In this embodiment, the level difference between the output of the AF sensor 9 when directly receiving the light from the standard light source A and that when directly receiving the light from the standard light source B or C is used as the correction data. However, the correction data may be as follows. The object is actually illuminated by the standard light sources A, B and C, and a difference $\Delta B_B$ between the output of the AF sensor 9 when receiving a reflection light of the standard light source A and the one when receiving a reflection light of the standard light source B and a difference $\Delta B_C$ between the output of the AF sensor 9 when receiving a reflection light of the standard light source A and the one when receiving a reflection light of the standard light source C are used as correction data. In the former case, since the light of the standard light source is directly received, the correction data are at a standard reflectivity of 18%. In the latter case, since the light reflected by the object is received, the obtained data approximates more to an actual correction data for the object and, therefore, the SAE control data can be corrected with higher accuracy.

Figure 17:
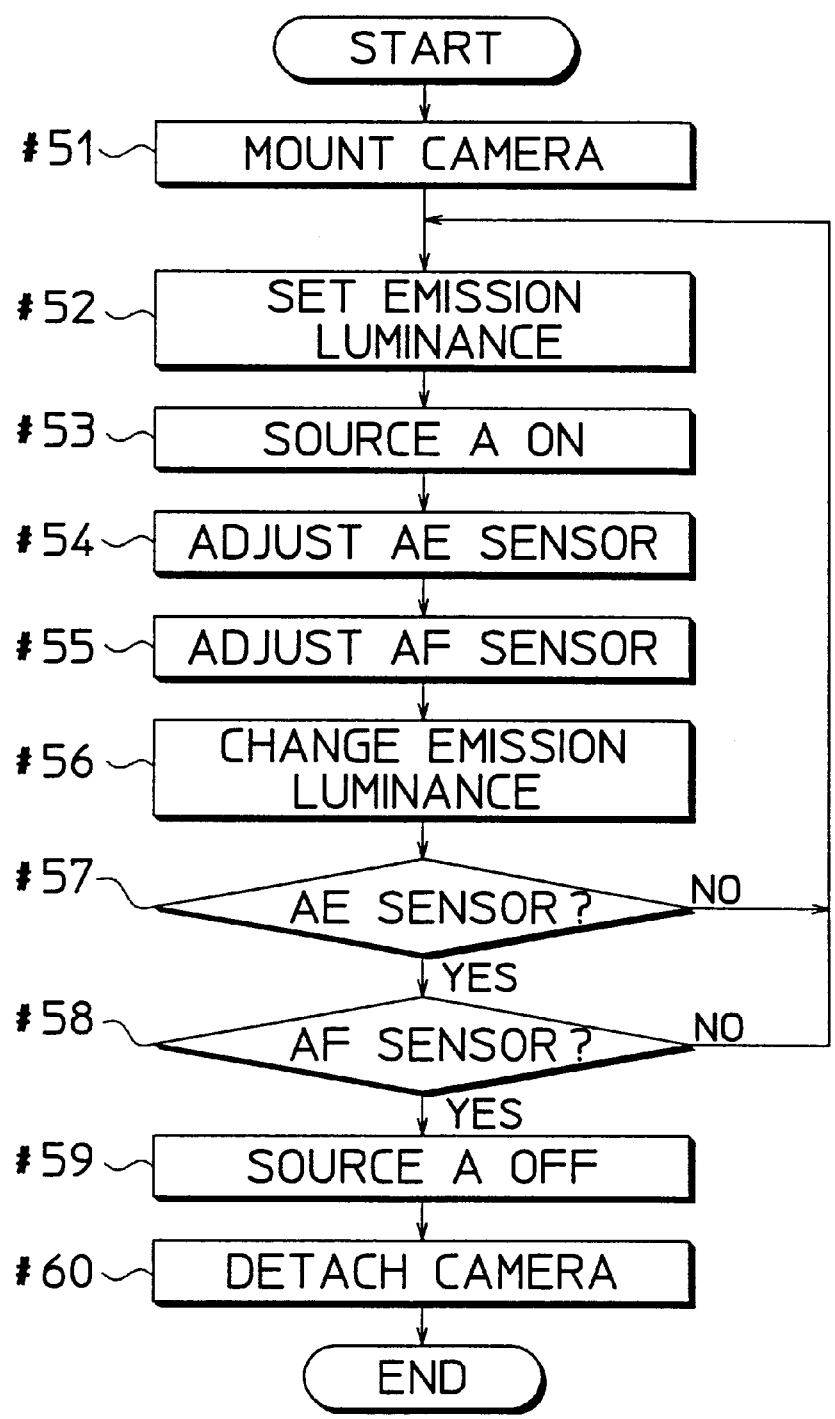
FIG. 17 is a flowchart of an output adjustment for the AF sensor and the AE sensor.

The output adjustments of the AF sensor 9 of the distance detector 5 and of the AE sensor of the light detector 4 may simultaneously performed using the same standard light source as shown in a flowchart of FIG. 17 since they are performed for the standard light source A.

First, the camera is mounted in an adjusting apparatus (Step #51) and the standard light source A is turned on after the emission luminance thereof is set at a predetermined value S (EV) (Steps #52, #53) Subsequently, the sensitivities of the AF sensor 9 and of the AE sensor are adjusted so that the outputs thereof become equal to the predetermined value S (Steps #54, #55). This sensitivity adjustment is made by changing the offset levels of the sensor outputs.

Thereafter, the emission luminance of the standard light source A is changed to a predetermined value S' different from the predetermined value S (Step #56), and variations in the outputs of the AF sensor 9 and of the AE sensor are observed (Steps #57, #58). If the outputs of the AF sensor 9 and of the AE sensor are not equal to the predetermined value S' (NO in Step #57 or #58), Step #52 follows to make the adjustment again. When the outputs of both AF sensor 9 and the AE sensor become equal to the predetermined S' (YES in Steps #57 and #58), the standard light source A is turned off (Step #59) and the adjustment is completed by detaching the camera from the adjusting apparatus (Step #60).

By simultaneously adjusting the outputs of the AF sensor 9 and of the AE sensor, the adjustment can be simplified and an occurrence of an adjustment error between the AF sensor 9 and the AE sensor can be reduced.

Next, the calculation of a control luminance value for the exposure control based on the light measurement data obtained by the light detector 4 and the SAE control data obtained by the distance detector 5 using the picked up image is described with reference to a flowchart of FIG. 18.

Figure 18:
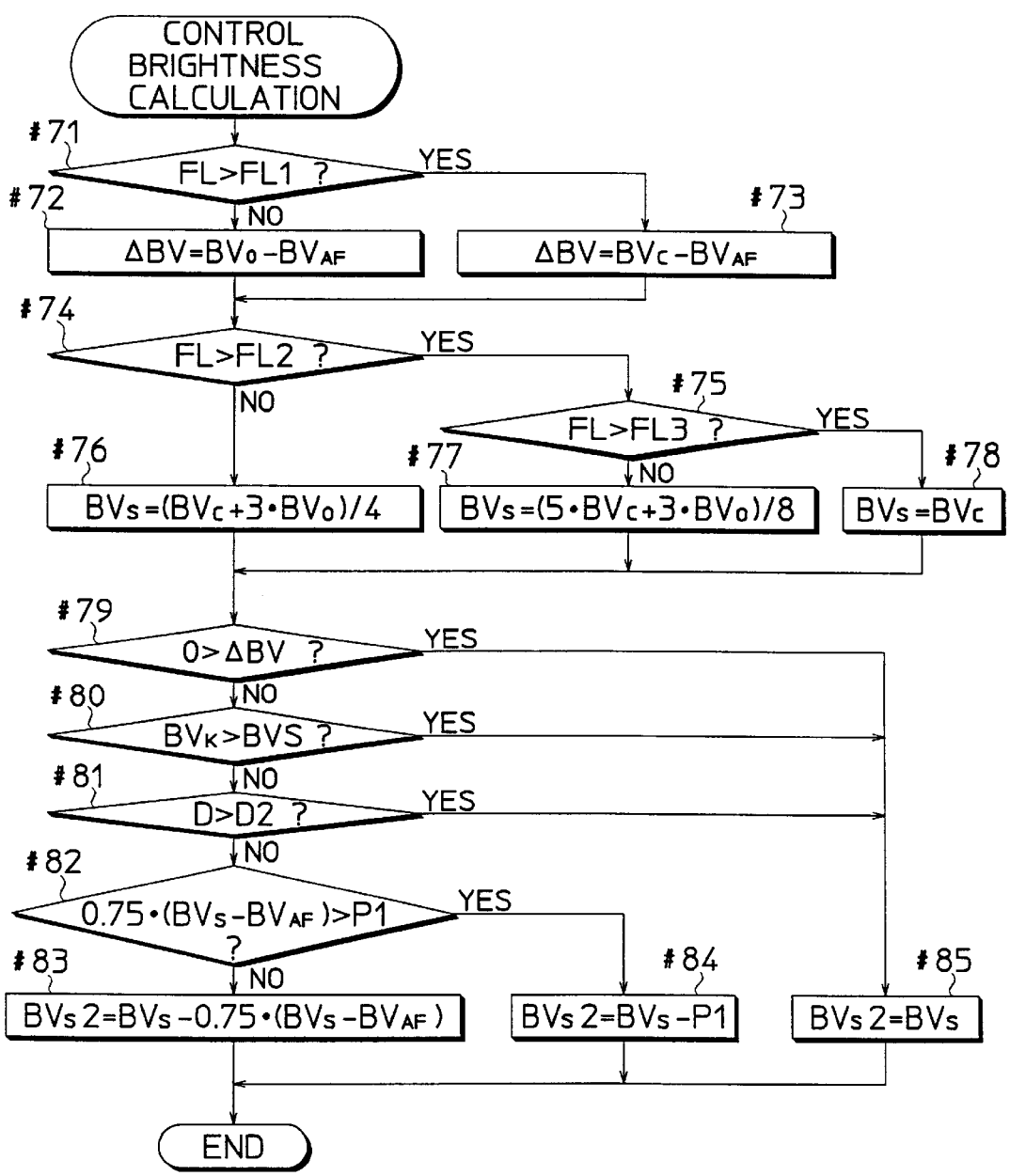
FIG. 18 is a flowchart of calculation of a control luminance value for an exposure control.

The flowchart of FIG. 18 includes the calculation of a luminance difference data $\Delta BV$ used for the back-light judgment (Steps #71 to #73), the calculation of a light measurement data (luminance value) $BV_S$ for the entire viewfinder frame 8 by the light detector 4 (Steps #74 to #78) and the calculation of a control luminance value $BV_S 2$ (Steps #79 to #85).

The luminance difference data $\Delta BV$ for the back-light judgment is calculated as follows. It is first judged whether the focal length FL of the taking lens 3 detected by the focal length detector 14 is longer than a predetermined threshold value FL1 (e.g. 60 mm) (Step #71). If FL>FL1 (YES in Step #71), a luminance difference ($BV_C - BV_{AF}$) between a light measurement data $BV_C$ of the peripheral portion obtained by the light detector 4 (hereinafter, "peripheral light measurement data $BV_C$") and an SAE control data (luminance value) $BV_{AF}$ of the spot detecting area is set as the luminance difference data $\Delta BV$ (Step #72). If FL$\leq$FL1 (NO in Step #71), a luminance difference ($BV_0 - BV_{AF}$) between a light measurement data $BV_0$ of the middle portion obtained by the light detector 4 (hereinafter, the middle light measurement data $BV_0$) and the SAE control data $BV_{AF}$ is set as the luminance difference data $\Delta BV$ (Step #73).

Since the size of the object image within the viewfinder frame 8 is substantially equal to or larger than the middle light detecting area if FL>FL1, the luminance difference between the peripheral light measurement data $BV_C$ and the SAE control data $BV_{AF}$ is set as the luminance difference data. Since the size of the object image within the viewfinder frame 8 is assumed to be smaller than the middle light detecting area if FL≦FL1, the luminance difference between the middle light measurement data $BV_C$ and the SAE control data $BV_{AF}$ is set as the luminance difference data.

Subsequently, the light measurement data $BV_S$ for the entire viewfinder frame 8 by the light detector 4 is calculated by dividing the size of the object image within the viewfinder frame 8 into three sizes depending upon the focal length of the taking lens 3 and by calculating a weighted logarithmic average value of the peripheral light measurement data $BV_0$ and the middle light measurement data $BV_C$ according to the respective sizes.

Specifically, it is judged whether the focal length FL is longer than a predetermined threshold value FL2 (Step #74). If FL≦FL2 (NO in Step #74), a weighted logarithmic average luminance value obtained by logarithmically weighting and averaging the middle light measurement data $BV_C$ and the peripheral light measurement data $BV_0$ at a ratio of 1:3 (($BV_C$+3·$BV_0$)/4) is set as the light measurement data $BV_S$ (Step #75). If FL >FL2 (YES in Step #74), it is judged whether the focal length FL is longer than a predetermined threshold value FL3 (Step #76). If FL2<FL ≦FL3 (NO in Step #76), a weighted logarithmic average luminance value obtained by logarithmically weighting and averaging the middle light measurement data $BV_C$ and the peripheral light measurement data $BV_0$ at a ratio of 5:3 ((5·$BV_C$+3·$BV_0$)/8) is set as the light measurement data $BV_S$ (Step #77). If FL >FL3 (YES in Step #76), the middle light measurement data $BV_C$ is set as the light measurement data $BV_S$ (Step #78).

The shorter the focal length FL of the taking lens 3, the wider the angular field thereof and the view to be photographed. Accordingly, the luminance balance of the entire viewfinder frame is suitably adjusted by increasing the weight of the luminance of the peripheral portion with respect to that of the middle portion within the viewfinder frame 8. If the focal length FL of the taking lens 3 is longer than the predetermined threshold value FL3 (if the size of the object image within the viewfinder frame 8 is assumed to be larger than the middle light detecting area), only the middle light measurement data $BV_0$ is used in order to reduce the influence of the luminance of the background on the luminance of the object.

The control luminance value $BV_S2$ is calculated as follows. If a photographic scene is under front light (hereinafter, "normal photographic scene"), the luminance data BVS is set as the control luminance value $BV_S2$. If a photographic scene is back light, the control luminance value $BV_S2$ is calculated by applying a specified correction to the luminance data $BV_S$ in accordance with a light source information and the object distance.

Specifically, it is first judged whether the luminance difference data Δ BV is smaller than 0 (negative) (Step #79). This judgment is made to discriminate whether the photographic scene is back light or not. If 0≦Δ BV, i.e. if the photographic scene is back light (NO in Step #79), the following is successively judged whether the luminance data $BV_S$ is smaller than a predetermined threshold value $BV_K$ (Step #80), whether the object distance D is shorter than a predetermined threshold value D2 (e.g. 15 m) (Step #81) and whether a correction data P (=0.75 ($BV_S$-$BV_{AF}$)) is larger than an upper limit P1 of the range of this correction data P (Step #82).

The judgment in Step #80 is made to assume whether the light source illuminating the object is natural light. Since the luminance data $BV_S$ under an artificial light source such as a fluorescent lamp or an incandescent lamp is about 2 to 5 (EV), the light source illuminating the object is assumed to be natural light when the luminance data $BV_S$ is larger than a specific value.

Further, the correction value is obtained by multiplying a luminance difference Δ BV' between the luminance data $BV_S$ and the SAE control data $BV_{AF}$ by a specific coefficient k (in this embodiment, k=0.75). The control luminance value $BV_S2$ is corrected toward an overexposure side according to how much the photographic scene is back light (Δ BV'). Since the latitude of the film is wider at the overexposure side, the exposure of the object located in the center of the viewfinder frame 8 is maximally adjusted by correcting the control luminance value $BV_S2$ toward the overexposure side within the limits of the correction according to how much the photographic scene is back light. This also enables the attainment of a proper exposure for the main object even in the case that flash light is unlikely to reach the main object in flash photographing.

The luminance difference Δ BV' is used as the correction data P and a correction amount is set larger than the luminance difference Δ BV' in consideration of the following. The spectral sensitivity of the AF sensor 9 is skewed toward the infrared spectrum as compared with that of the AE sensor, and no accurate sensitivity information of the visible spectrum is obtained from the output of the AF sensor 9 (i.e. the accuracy of the SAE control data $BV_{AF}$ is lower than that of the light measurement data $BV_C$, $BV_0$ obtained by the light detector 4). Further, the correction data P is set at its upper limit value P1 for the same reason.

The judgment in Step #81 is made for the following reason. If the object is at a long distance from the camera, the size of the object image K within the viewfinder frame 8 is too small, and it is not clear whether the spot detecting area (AF control area) securely covers the object image. Thus, the correction of the control luminance value $BV_S2$ toward the overexposure side is prohibited when the object distance D is longer than the predetermined threshold value D2.

Accordingly, in the back light photographic scene, if $BV_S$≧$BV_K$ (natural light source), if D≦D1 (not long distance) or if P≦P1 (the correction value is the upper limit value or lower) (NO in Steps #80 to #82), a data ($BV_S$-0.75 ($BV_S$-$BV_{AF}$) obtained by subtracting the correction data P from the luminance data $BV_S$ is set as the control luminance value $BV_S2$ (Step #83). Further, in the back light photographic scene, if $BV_S$≧$BV_K$ and D≦D1 (NO in Steps #80 and #81) but if P>P1 (the correction value is larger than the upper limit value) (YES in Step #82), a data obtained by multiplying the luminance data $BV_S$ by the upper limit value P1 is set as the control luminance value $BV_S2$ (Step #84).

On the other hand, if the photographic scene is a normal photographic scene (YES in Step #79), if $BV_S$<$BV_K$ (artificial light source) in the back light photographic scene (YES in Step #80), or if $BV_S$<$BV_K$ (artificial light source) and D>D2 (long distance) in the back light photographic scene (YES in Step #81), the luminance data $BV_S$ is set as the control luminance data $BV_S2$ without any correction by the correction data P (Step #85). In other words, in the case of the above conditions, the exposure control is performed using only the light measurement data calculated by the light detector 4 without considering the SAE control data $BV_{AF}$ as the control luminance value.

Particularly, the SAE control data $BV_{AF}$ is not considered for the following reason in the case that the light source illuminating the object in the back light photographic scene is assumed to be an artificial light source. For example, since there are almost no wavelength components longer than 700 nm under a fluorescent lamp, the SAE control data $BV_{AF}$ is likely to be at the underexposure side. On the other hand, since there are a great number of wavelength components in the infrared spectrum under an incandescent lamp, the SAE control data $BV_{AF}$ is likely to be at the overexposure side. Accordingly, the back light judgment cannot be accurately made by comparing the light measurement data $BV_C$ or $BV_0$ and the SAE control data $BV_{AF}$. Therefore, the correction of the control luminance value according to how much the photographic scene is back light is prohibited.

Next, the back light detection based on the luminance difference data $\Delta BV$ is described. This detection is used for the determination of an automatic control of the built-in flash 7 to be described later, and is performed in accordance with a flowchart "Back Light Detection" shown in FIG. 19.

Figure 19:
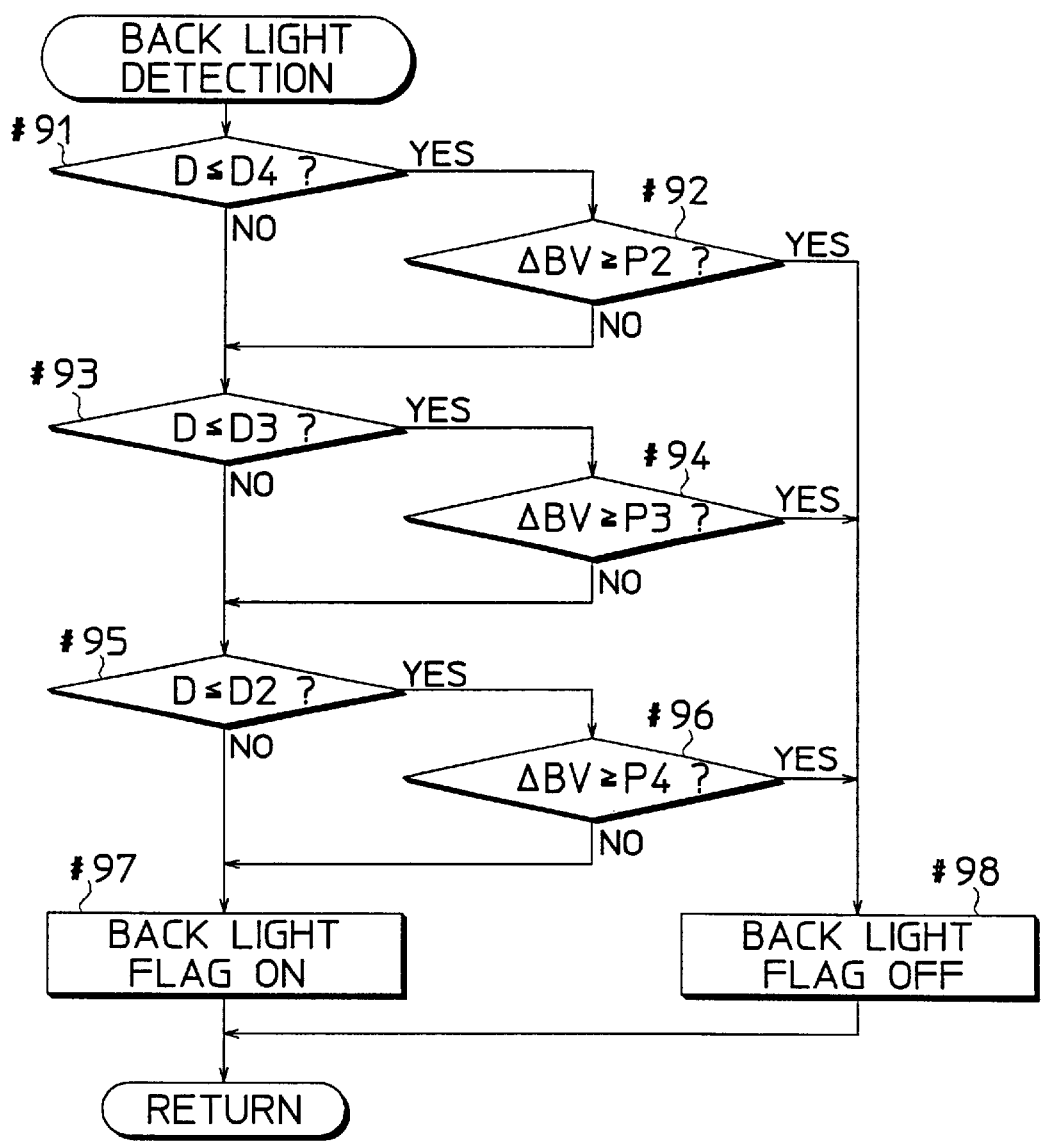
FIG. 19 is a flowchart of a processing "Back light Detection"
Figure 20:
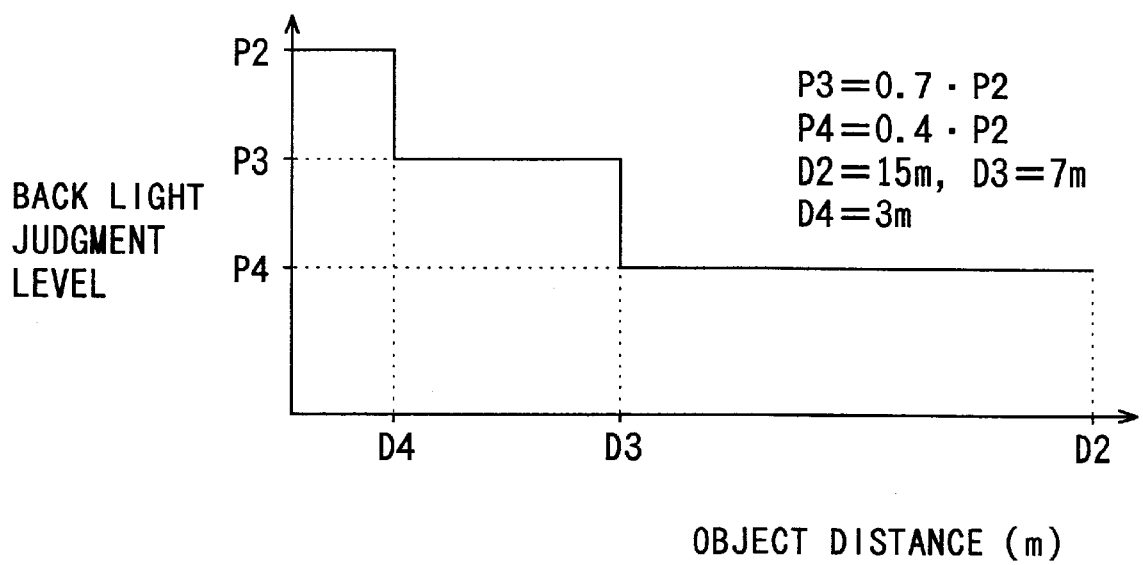
FIG. 20 is a graph showing a relationship of the object distance and back light judgment levels.

In the flowchart of FIG. 19, the object distance range is divided into three sub-ranges "short distance", "middle distance" and "long distance", and the back light detection is made by comparing back light judgment levels P2, P3, P4 (P2>P3>P4) set in advance for the respective sub-ranges and the luminance difference data $\Delta BV$. The relationship between the judgment levels P2, P3, P4 and the object distance D is set such that the longer the object distance D, the lower the judgment level as shown in FIG. 20.

Specifically, it is first judged whether the object distance D is not longer than a predetermined threshold value D4 (e.g. 3 m) used for a short distance judgment (Step #91). If D≦D4 (short distance) (YES in Step #91), the back light detection is made by comparing the luminance difference data $\Delta BV$ and the short distance judgment level P2 (Step #92). If $\Delta BV \geq P2$ (YES in Step #92), an back light flag indicative of the back light photographic scene is set (ON) (Step #98), and this routine returns.

If D>D4 (NO in Step #91) or $\Delta BV<P2$ (NO in Step #92), it is judged whether the object distance D is not longer than a predetermined threshold value D3 (e.g. 7 m) used for a middle distance judgment (Step #93). If D<D3 (middle distance) (YES in Step #93), the back light detection is made by comparing the luminance difference data $\Delta BV$ and the middle distance judgment level P3 (<P2, e.g. 0.7·P2) (Step #94). If $\Delta BV \geq P3$ (YES in Step #94), the back light flag is set (ON) (Step #98), and this routine returns.

If D>D3 (NO in Step #93) or $\Delta BV<P3$ (NO in Step #94), it is judged whether the object distance D is not longer than a predetermined threshold value D2 (e.g. 15 m) used for a long distance judgment (Step #95). If D≦D5 (long distance) (YES in Step #95), the back light detection is made by comparing the luminance difference data $\Delta BV$ and the long distance judgment level P4 (<P3, e.g. 0.4·P2) (Step #96). If $\Delta BV>P4$ (YES in Step #96), the back light flag is set (ON) (Step #98), and this routine returns. On the other hand, if D>D2 (NO in Step #95) or $\Delta BV<P4$ (NO in Step #96), the back light flag is reset (OFF) (Step #97) and this routine returns.

Next, the automatic control of the built-in flash 7 is described with reference to a flowchart "Flash Firing Determination" shown in FIG. 21.

Figure 21:
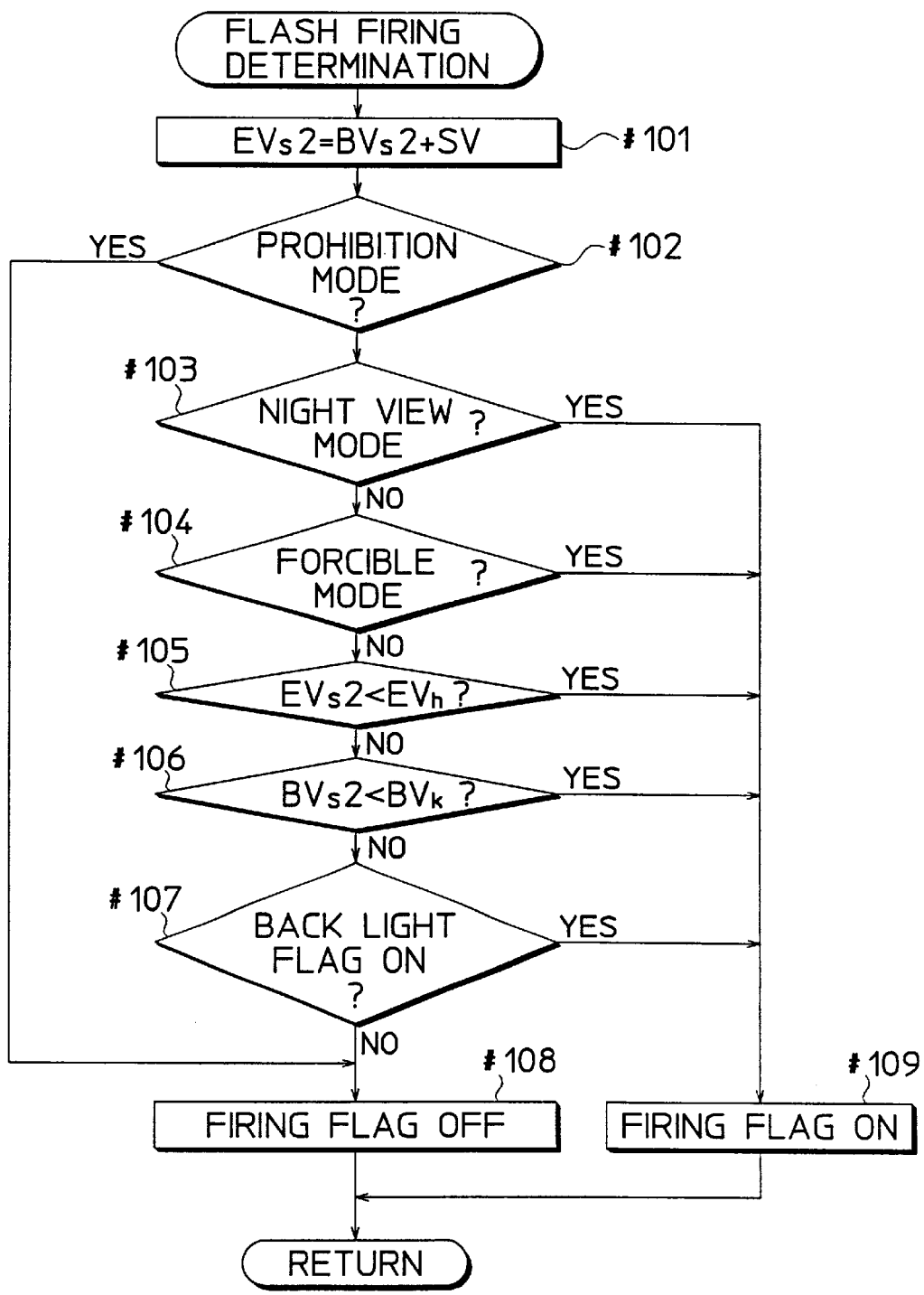
FIG. 21 is a flowchart of a processing "Flash Firing Determination"

The flowchart of FIG. 21 is for the case where the camera 1 is provided with photographing modes concerning flash photographing such as a firing prohibition mode, a night view portrait mode and a forcible firing mode. The firing prohibition mode is a mode in which flash firing is forcibly prohibited in a dark place where flash photographing is required, and photographing is performed under available light. The forcible firing mode is a mode in which photographing is performed by forcibly firing the flash in a bright place where flash photographing is not necessary required. Further, the night view portrait mode is a mode in which a person standing in a night view is illuminated and photographed to obtain a portrait picture.

Upon entering the routine "Flash Firing Determination", an exposure control value $EV_S2$ (=$BV_S2$+SV) is calculated based on the control luminance value $BV_S2$ and the film sensitivity SV (Step #101). It is then judged whether the firing prohibition mode is set (Step #102). If the firing prohibition mode is set (YES in Step #102), a firing flag indicative of flash firing is reset (OFF) (Step #108) and this routine returns. If the firing prohibition mode is not set (NO in Step #102), it is successively judged whether the night view mode is set and whether the forcible firing mode is set (Steps #103, #104). If either one of these modes is set (YES in Step #103 or #104), the firing flag is set (ON) (Step #109) and this routine returns.

If none of flash firing modes is set (NO in Steps #102 to #104), it is successively judged whether the exposure control value $EV_S2$ is smaller than a camera shake limit exposure value EVh, whether the control luminance value $BV_S2$ is smaller than the threshold value $BV_K$, and whether the back light flag is set (Steps #105 to #107). If $EV_S2<EVh$, $BV_S2<BV_K$ or the back light flag is set (YES in Step #105, #106 or #107), the firing flag is set (ON) (Step #109). If $EV_S2 \geq EVh$, $BV_S2 \geq BV_K$ and the back light flag is reset (NO in Steps #105 to #107), the firing flag is reset (OFF) (Step #108) and this routine returns.

In the above flash firing control, Steps #102 to #104 are provided to enable the camera operator to control the flash firing according to his will. Step #105 is provided to fire the flash, when the object is darker than the camera shake limit without an auxiliary light, in order to obtain a proper exposure control. When the light source illuminating the object is assumed to be an artificial light source, the SAE control data of the light detector spot having detected the luminance of the main object has a low reliability and the luminance of the object is low as compared to the case where the object is under natural light. Accordingly, Step #106 is provided to prevent an exposure control error as much as possible by constantly firing the flash in such a case. Step #107 is provided to properly adjust the exposure of the main object by firing the flash when the back light flag is set because the main object is darker than the background in such a case.

Figure 22:
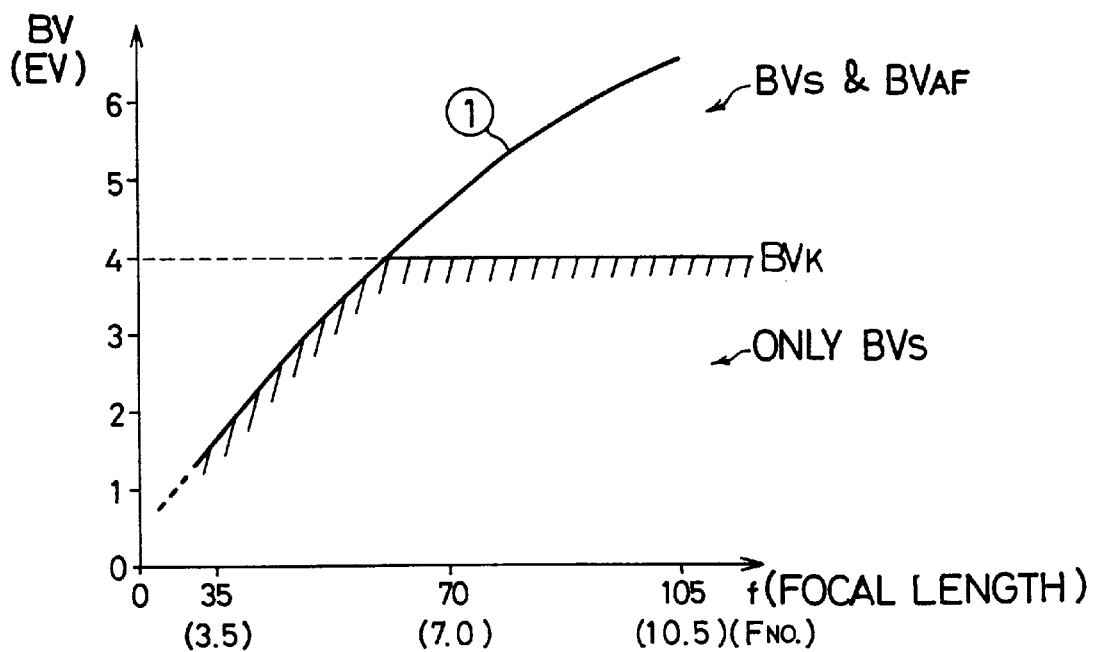
FIG. 22 is a diagram showing a relationship between a range of the object luminance under the exposure control by a light measurement data $BV_S$ obtained by the light detector and the SAE control data obtained by the distance detector and a range of the object luminance under the exposure control only by the light measurement data $BV_S$ obtained by the light detector.

FIG. 22 is a diagram showing a relationship between a range of the object luminance under the exposure control by the light measurement data $BV_S$ obtained by the light detector 4 and the SAE control data obtained by the distance detector 5 and a range of the object luminance under the exposure control only by the light measurement data $BV_S$ obtained by the light detector 4.

In FIG. 22, the threshold value $BV_K$ used for the judgment as to whether the light source illuminating the object is an artificial light source is set equal to 4 EV. Accordingly, in an area where $EV_S>4$ EV, the exposure control is performed using the light measurement data $BV_S$ based on the output of the light detecting sensor and the SAE control data based on the output of the AF sensor 9. In an area where $BV_S \leq 4$ EV, the exposure control is performed only using the light measurement data $BV_S$ based on the output of the light detecting sensor.

A curve ① represents an object luminance which requires flash firing due to the camera shake limit, and is calculated by BV=AV+TV-SV(EV) where SV, AV, TV denote a film sensitivity, an aperture value and a shutter speed, respectively.

With a zoom lens, AV=$\log_2(F_{NO})^2$ since $F_{NO}$ increases substantially in proportion to a zooming ratio, and TV=$\log_2$(1/f) since the shutter speed is in inverse proportion to a focal length f. Accordingly, the curve ① is calculated by BV=2·$\log_2(F_{NO})$-$\log_2$(f)-SV assuming that the film sensitivity ISO=400 and the BV=7.

Accordingly, in the exposure control in flash photographing shown in the flowchart of FIG. 21, the built-in flash 7 is automatically fired to perform flash photographing in a hatched region enclosed by the line BV =4(EV) and the curve ①.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
   a luminance detection sensor which has a first spectral sensitivity, and receives light from a first region of a photographing view, and generates a first luminance information based on the received light from said first region;
   a distance detection sensor which has a second spectral sensitivity, and receives light from a second region of the photographing view smaller than said first region, said distance detection sensor generates a distance information concerning a distance to an object based on the received light from said second region, and generates second luminance information based on the received light from said second region; and
   a calculator which calculates a control luminance value for exposure control based on the first luminance information and second luminance information outputted from said distance detection sensor when the first luminance information is above a predetermined threshold value, and calculates a control luminance value based on the first luminance information when the first luminance information is below the predetermined threshold value.

2. A camera as defined in claim 1, further comprising:
   an electronic flash; and
   an emission controller which controls the electronic flash to fire a flash when the first luminance information is below the predetermined threshold value.

3. A camera as defined in claim 1, wherein the calculator calculates correction data for correcting a control luminance value based on a difference between the first luminance information and the second luminance information.

4. A camera as defined in claim 3, wherein the calculated correction data is proportional with the difference between the first luminance information and the second luminance information.

5. A camera as defined in claim 1, wherein:
   the first spectral sensitivity lies substantially within a visible spectrum; and
   the second spectral sensitivity being partially outside of the visible spectrum.

6. The camera as defined in claim 1, wherein said distance detection sensor includes a plurality of pixels.

7. The camera as defined in claim 1, wherein said second region is included in said first region.

8. A camera comprising:
   a distance detection sensor which includes an image pick-up element having a spectral sensitivity being partially outside of a visible spectrum and operable to receive light from a predetermined region of a photographing view, said distance detection sensor generates a distance information concerning a distance to an object based on the received light, and generates information indicative of luminance in the predetermined region of a photographing view based on the received light;
   a luminance detector which generates a luminance information for exposure control based on the information indicative of luminance outputted from said distance detection sensor;
   a memory which stores correction information for eliminating an error in the luminance information caused by the spectral sensitivity of the distance detection sensor; and
   a corrector which corrects the luminance information based on the correction information.

9. A camera as defined in claim 8, wherein the luminance detector has a reference adjusted based on a standard light source A.

10. A camera as defined in claim 9,
    wherein the correction information is a difference between a luminance information when the distance detection sensor receives light from the standard light source A and a luminance information when the distance detection sensor receives light from a standard light source B.

11. A camera as defined in claim 9, wherein the correction information is a difference between a luminance information when the distance detection sensor receives light from an object illuminated by the standard light source A and a luminance information when the distance detection sensor receives light from an object illuminated by the standard light source B.

12. A camera as defined in claim 8, further comprising a light source detector which detects various types of light sources, wherein the memory stores a plurality of kinds of correction information respectively corresponding to the plurality of light source types, and the corrector corrects the luminance information based on a correction information corresponding to the type of light source detected.

13. A camera as defined in claim 12, wherein the light source detector judges based on a variation in image information sent from the distance detection sensor at a predetermined period whether or not an instant light source is an artificial light source.

14. The camera as defined in claim 8, wherein said image pick-up element includes a plurality of pixels.

15. A camera comprising:
    a distance detector which includes a sensor provided with image pick-up elements for picking up an object image, said distance detector generates a distance information concerning a distance to each of a plurality of first divisions of the picked up image, and generates luminance information based on respective outputs of a plurality of second divisions of the picked up image by said image pickup element, said second divisions being different from said first divisions; and
    a luminance calculator which calculates light measurement information for exposure control based on said luminance information.

16. A camera as defined in claim 15, wherein each of the second divisions is equal or smaller than each of the first divisions.

17. A camera as defined in claim 16, wherein the first divisions includes at least one of the second divisions.

18. A camera as defined in claim 15, further comprising a memory which stores a light measurement information calculated by the luminance calculator.

19. A camera as defined in claim 18, further comprising a distance calculator which performs a calculation based on distance informations after the light measurement information is in the memory.

20. The camera as defined in claim 15, wherein said image pick-up element includes a plurality of pixels.

21. A camera comprising:
a luminance detection sensor which has a first spectral sensitivity, and receives light from a first region of a photographing view, and generates a first luminance information based on the received light from said first region;
a distance detection sensor which has a second spectral sensitivity, and receives light from a second region of the photographing view smaller than said first region, and generates information concerning a distance to an object and which is dependent on luminance of the object based on the received light from said second region; and
a calculator which calculates a control luminance value for exposure control based on the first luminance information and information outputted from said distance detection sensor as a second luminance information when the first luminance information is above a predetermined threshold value, and calculates a control luminance value based on the first luminance information when the first luminance information is below the predetermined threshold value.

22. A camera as defined in claim 21, further comprising:
an electronic flash; and
an emission controller which controls the electronic flash to fire a flash when the first luminance information is below the predetermined threshold value.

23. A camera as defined in claim 21, wherein the calculator calculates correction data for correcting a control luminance value based on a difference between the first luminance information and the second luminance information.

24. A camera as defined in claim 23, wherein the calculated correction data is proportional with the difference between the first luminance information and the second luminance information.

25. A camera as defined in claim 21, wherein:
the first spectral sensitivity lies substantially within a visible spectrum; and
the second spectral sensitivity being partially outside of the visible spectrum.

26. A camera as defined in claim 21, wherein said distance detection sensor includes a plurality of pixels.

27. A camera as defined in claim 21, wherein said second region is included in said first region.

28. A camera comprising:
a distance detection sensor which includes an image pick-up element having a spectral sensitivity being partially outside of a visible spectrum and operable to receive light from a predetermined region of a photographing view, and generates information concerning a distance to an object and which is dependent on luminance of the object based on the received light;
a luminance detector which generates a luminance information for exposure control based on information outputted from said distance detection sensor;
a memory which stores correction information for eliminating an error in the luminance information caused by the spectral sensitivity of the distance detection sensor; and
a corrector which corrects the luminance information based on the correction information.

29. A camera as defined in claim 28, wherein the luminance detector has a reference adjusted based on a standard light source A.

30. A camera as defined in claim 29, wherein the correction information is a difference between a luminance information when the distance detection sensor receives light from the standard light source A and a luminance information when the distance detection sensor receives light from a standard light source B.

31. A camera as defined in claim 29, wherein the correction information is a difference between a luminance information when the distance detection sensor receives light from an object illuminated by the standard light source A and a luminance information when the distance detection sensor receives light from an object illuminated by the standard light source B.

32. A camera as defined in claim 28, further comprising a light source detector which detects various types of light sources, wherein the memory stores a plurality of kinds of correction information respectively corresponding to the plurality of light source types, and the corrector corrects the luminance information based on a correction information corresponding to the type of light source detected.

33. A camera as defined in claim 32, wherein the light source detector judges based on a variation in image information sent from the distance detection sensor at a predetermined period whether or not an instant light source is an artificial light source.

34. The camera as defined in claim 28, wherein said image pick-up element includes a plurality of pixels.

* * * * *